(12) United States Patent
Nakajima et al.

(10) Patent No.: US 11,851,344 B2
(45) Date of Patent: Dec. 26, 2023

(54) COMPLEX OXIDE CERAMIC, METHOD FOR PRODUCING SAME, AND ARTICLE

(71) Applicants: TOKYO INSTITUTE OF TECHNOLOGY, Tokyo (JP); KANAGAWA INSTITUTE OF INDUSTRIAL SCIENCE AND TECHNOLOGY, Ebina (JP); NGK SPARK PLUG CO., LTD., Nagoya (JP)

(72) Inventors: Akira Nakajima, Tokyo (JP); Takumi Matsumoto, Tokyo (JP); Sachiko Matsushita, Tokyo (JP); Toshihiro Isobe, Tokyo (JP); Kayano Sunada, Ebina (JP)

(73) Assignees: TOKYO INSTITUTE OF TECHNOLOGY, Tokyo (JP); KANAGAWA INSTITUTE OF INDUSTRIAL SCIENCE AND TECHNOLOGY, Ebina (JP); NGK SPARK PLUG CO., LTD., Nagoya (JP)

( * ) Notice: Subject to any disclaimer, the term of this patent is extended or adjusted under 35 U.S.C. 154(b) by 313 days.

(21) Appl. No.: 17/260,850

(22) PCT Filed: Jul. 16, 2019

(86) PCT No.: PCT/JP2019/027882
§ 371 (c)(1),
(2) Date: Jan. 15, 2021

(87) PCT Pub. No.: WO2020/017493
PCT Pub. Date: Jan. 23, 2020

(65) Prior Publication Data
US 2021/0261432 A1     Aug. 26, 2021

(30) Foreign Application Priority Data

Jul. 18, 2018   (JP) .................................. 2018-134810

(51) Int. Cl.
$C04B\ 35/495$      (2006.01)
$C01G\ 41/00$       (2006.01)
(Continued)

(52) U.S. Cl.
CPC ........... $C01G\ 41/006$ (2013.01); $A01N\ 25/12$ (2013.01); $A01N\ 59/16$ (2013.01); $C01G\ 39/006$ (2013.01);
(Continued)

(58) Field of Classification Search
CPC .......... $C04B\ 35/495$; $C04B\ 2235/3227$; $A01N\ 25/12$
See application file for complete search history.

(56) References Cited

FOREIGN PATENT DOCUMENTS

CN     1962460 A   *   5/2007
CN     1962460 A       5/2007
(Continued)

OTHER PUBLICATIONS

Laligant et al. (J Solid State Chemistry, 159, 20001, 223-227 (Year: 2001).*

(Continued)

*Primary Examiner* — Kyle A Purdy
(74) *Attorney, Agent, or Firm* — STITES & HARBISON PLLC; Jeffrey A. Haeberlin; Trevor T. Graves

(57) ABSTRACT

A complex oxide ceramic according to an embodiment is a complex oxide ceramic including a rare earth element and at least one element selected from among molybdenum, tungsten, and vanadium. An example of the rare earth element is at least one species selected from among La, Ce, and Gd.

12 Claims, 15 Drawing Sheets

(51) Int. Cl.
- *A01N 59/16* (2006.01)
- *A01N 25/12* (2006.01)
- *C01G 39/00* (2006.01)

(52) U.S. Cl.
CPC ........ *C04B 35/495* (2013.01); *C01P 2002/50* (2013.01); *C04B 2235/3227* (2013.01)

(56) References Cited

FOREIGN PATENT DOCUMENTS

| | | |
|---|---|---|
| JP | 2015-140277 A | 8/2015 |
| JP | 2002-102322 A | 4/2022 |

OTHER PUBLICATIONS

ACS Reagent Chemicals: ammonium molybdate tetrahydrate, 3 pages, 2017 (Year: 2017).*

Stewart et al., J Chem Phys, 63, 8, 1959, 1330-1331 (Year: 1959).*

Pechini et al., Handbook of Sol-Gel Science and Technology, 2016, 1-21.*

The State Intellectual Property Office of People's Republic of China, The First Office Action issued in corresponding Application No. 201980048061.6 dated Apr. 2, 2022.

Krishmamoorthy, K., et al. Nanostructured molybdenum oxide-based antibacterial paint: effective growth inhibition of various pathogenic bacteria, Nanotechnology 25, 315101(10pp) (2014). See: Background Art section of the subject application.

Liu, J., et al. Facile shape-controlled synthesis of lanthanum oxide with different hierarchical micro/ nanostructures for antibacterial activity based on phosphate removal, RSC Adv., 7, 40965-40972 (2017). See: Background Art section of the subject application.

Zhang, X,, et al. Superhydrophobic surfaces for the reduction of bacterial adhesion, RSC Adv., 3, 12003-12020 (2013). See: Background Art section of the subject application.

Nakajima, A., et al. Recent studies on super-hydrophobic films. Monatsh. Chem., 132, 31-41 (2001). See: Background Art section of the subject application.

Goutenoire, F., et al., "Crystal Structure of $La_2Mo_2O_9$, a New Fast Oxide-Ion Conductor", Chemistry of Materials, 2000, vol. 12, pp. 2575-2580. See: International Search Report.

Shi, X., et al., "Selective Crystallization of Four Tungstates ($La_2W_3O_{12}$, $La_2W_2O_9$, $La_{14}W_2O_{45}$, and $La_6W_2O_{15}$) via Hydrothermal Reaction and Comparative Study of $Eu^{3+}$ Luminescence", Inorganic Chemistry, May 18, 2018, vol. 57, pp. 6632-6640. See: International Search Report.

Kakihana, M. "Precisely-Controlled Synthesis of Oxide Powders by Polymerizable Complex Method Towards High-Performance", Journal of the Japan Society of Powder and Powder Metallurgy, 2007, vol. 54, No. 1, pp. 32-38. See: International Search Report, and English abstract.

Matsumoto, T., et al. "Preparation of hydrophobic $La2Mo2O9$ ceramics with antibacterial and antiviral properties", Journal of Hazardous Materials 378 (2019).

Japan Patent Office, International Search Report issued in corresponding Application No. PCT/JP2019/027882, dated Oct. 21, 2019.

European Patent Office, Extended European Search Report issued in corresponding Application No. 19838179.0 dated Mar. 22, 2022.

Kartsonakis, I. A. et al., Journal of Nanoparticle Research, "Photocatalytic action of cerium molybdate and iron-titanium oxide hollow nanospheres on *Escherichia coli*," [Online] vol. 15, No. 6, Jun. 2013, pp. 1-10, URL: https://link.springer.com/content/pdf/10.1007/s11051-013-1759-2.pdf>.

Kartsonakis, I.A., et al., Journal of the American Ceramic Society, "Synthesis and Characterization of Cerium Molybdate Nanocontainers and Their Inhibitor Complexes," [Online] vol. 93, No. 1, 2010, pp. 65-73.

Sellemi, H., et al., Journal of Alloys and Compounds, Elsevier Sequoia, Lausanne, CH, "Synthesis by the polyol process and ionic conductivity of nanostructured $La2Mo2O9$ powders," vol. 653, Aug. 29, 2015, pp. 422-433.

Tanimoto, R., et al. , Ceramic Society of Japan. Journal, "Effects of storage atmosphere and surface roughness on the hydrophobicity of $Gd2O3$ thin film and sintered body," vol. 125, No. 8, 2017, pp. 638-642, URL: https://www.jstage.jst.go.jp/article/jcersj2/125/8/125_17087/_pdf/-char/en>.

* cited by examiner

<MODEL TEST METHOD>

COMPLEX OXIDE CERAMIC, METHOD FOR PRODUCING SAME, AND ARTICLE

TECHNICAL FIELD

The present invention relates to a complex oxide ceramic, to a method for producing the same, and to an article provided with the complex oxide ceramic.

BACKGROUND ART

Metals such as Ag (silver) and Cu (copper), and photocatalysts such as titanium oxide and titanium apatite are known to serve as antibacterial/antiviral materials, and many of them are used in practice. However, a problem involved in photocatalysts is failure to exhibit antibacterial/antiviral activity in the dark (i.e., under no light). Also, Ag and Cu exhibit antibacterial/antiviral activity in the dark, but photocatalysts employing such a metal have a short service life and are expensive.

In recent years, it has been reported that molybdenum oxide exhibits antibacterial/antiviral activity in the dark (see, for example, Non-Patent Document 1). Also, antibacterial activity of lanthanum oxide is reported (see, for example, Non-Patent Document 2). Meanwhile, such properties of complex oxides have not been reported in detail. In addition to antibacterial materials, further development of antiviral materials is an essential issue to cope with a pandemic viral disease possibly occurring in the near future. However, at present, insufficient studies are conducted on such materials.

Separately, some studies have revealed that the antibacterial performance of a solid surface is enhanced by imparting water repellency to the surface, on which adsorption of water is suppressed (see, for example, Non-Patent Document 3).

The great majority of metal oxides including titanium oxide have a structure mainly of ionic bonding nature. Generally, oxygen atoms, which are greater in size than the cations, occupy the surface of such a metal oxide. In the air, water molecules are dissociated on the metal oxide surface. The generated $H^+$ is bound to surface oxygen, to thereby form a hydroxyl group. The released $OH^-$ coordinates to the metal and is surrounded by hydroxyl groups. On such a structure, several or more water molecules are physically adsorbed, whereby hydrophilicity is generally attained.

In order to impart water repellency to metal oxide, a surface treatment is generally conducted by use of an organic material such as wax and a water-repellent silane (see, for example, Non-Patent Document 4). However, the water repellency of the metal oxide surface-treated with an organic material has problematically low persistence (durability), and thus there is demand for a material having highly durable water repellency.

The present inventors disclose in Patent Document 1 a technique for imparting water repellency to the surface of an oxide ceramic without using an organic material. According to Patent Document 1, an oxide ceramic material having durability in water repellency can be produced.

However, there has never been produced an oxide ceramic material having both self-water repellency and an antibacterial/antiviral property.

CITATION LIST

Patent Literature

Patent Document 1: JP-A-2015-140277

Non Patent Literature

Non-Patent Document 1: K Krishnamoorthy, M. Premanathan, M. Veerapandian, S. J. Kim, Nanostructured molybdenum oxide-based antibacterial paint: effective growth inhibition of various pathogenic bacteria, Nanotechnology 25, 315101 (10pp) (2014)

Non-Patent Document 2: J. Liu, G. Wang, L. Lu, Y. Guo, L. Yang, Facile shape-controlled synthesis of lanthanum oxide with different hierarchical micro/nanostructures for antibacterial activity based on phosphate removal, RSC Adv., 7, 40965-40972 (2017).

Non-Patent Document 3: X Zhang, L. Wang, E. Levanen, Superhydrophobic surfaces for the reduction of bacterial adhesion, RSC Adv., 3, 12003-12020 (2013)

Non-Patent Document 4: A. Nakajima, K. Hashimoto, T. Watanabe, Recent studies on super-hydrophobic films. Monatsh. Chem., 132, 31-41 (2001).

SUMMARY OF INVENTION

Technical Problem

The present invention has been conceived under such circumstances. Thus, an object of the present invention is to provide a complex oxide ceramic having both self-water repellency and an antibacterial/antiviral property. Another object is to provide a method for producing the complex oxide ceramic. Still another object is to provide an article including the complex oxide ceramic and having both water repellency and an antibacterial/antiviral property.

Solution to Problem

The present inventors have conducted extensive studies and have found that a new material having both self-water repellency and an antibacterial/antiviral property can be produced, without employing a surface treatment with an organic material, by firing a complex oxide containing a rare earth element and at least one element selected from among molybdenum, tungsten, and vanadium. The present invention has been accomplished on the basis of this finding.

Accordingly, an embodiment of the complex oxide ceramic according to the present invention is a complex oxide ceramic including a rare earth element and at least one element selected from among molybdenum, tungsten, and vanadium.

In an embodiment of the complex oxide ceramic, the rare earth element is at least one species selected from among La, Ce, and Gd.

An embodiment of the complex oxide ceramic is represented by $(La_{2-x}Ce_x)(Mo_{2-y}W_y)O_9$ (x=0 to 2, y=0 to 2).

An embodiment of the complex oxide ceramic is represented by $La_2(Mo_{2-y}W_y)O_9$ (y=0 to 2).

An embodiment of the complex oxide ceramic is represented by $La_2Mo_2O_9$.

An embodiment of the complex oxide ceramic is represented by $La_2W_2O_9$.

In an embodiment of the complex oxide ceramic, the surface thereof has a water contact angle of 88° to 119°.

In an embodiment of the complex oxide ceramic, at the surface of the complex oxide ceramic, the ratio of carbon to the sum of the rare earth element and the at least one element selected from among molybdenum, tungsten, and vanadium is 1.7 atm % to 2.1 atm %.

In an embodiment of the complex oxide ceramic, the percent bacterial or viral reduction as measured after passage of 6 hours through the film cover method is 99% or greater.

An embodiment of the article according to the present invention is an article provided with the complex oxide ceramic on at least a part of the surface thereof.

An embodiment of the complex oxide ceramic production method according to present invention includes
- a gelating step including adding a hydroxycarboxylic acid and a glycol to an aqueous solution containing a rare earth element-containing compound and at least one element selected from among molybdenum, tungsten, and vanadium, and then heating to cause esterification reaction between the hydroxycarboxylic acid and the glycol, to thereby induce gelation;
- a drying step of drying a gel formed in the gelating step;
- a calcining step of calcining a powder obtained by drying the gel;
- a molding step of molding the calcined powder; and
- a firing step of firing a compact formed through the molding step.

In an embodiment of the production method, in the firing step, the compact is fired in an atmosphere having a water content of 1,000 ppm or lower and an organic substance concentration of 1,000 ppm or lower, and containing oxygen in an amount of 0.1% or greater.

In an embodiment of the production method, a rare earth nitrate salt is used as the rare earth element-containing compound, and
ammonium molybdate is used as a molybdenum-containing compound.

In an embodiment of the production method, lanthanum nitrate hexahydrate is used as the rare earth element-containing compound, and
ammonium molybdate tetrahydrate is used as a molybdenum-containing compound.

In an embodiment of the production method, the hydroxycarboxylic acid is citric acid, and
the glycol is ethylene glycol.

Advantageous Effects of Invention

The present invention enables provision of a complex oxide ceramic having both self-water repellency and an antibacterial/antiviral property, a method for producing the complex oxide ceramic, and an article including the complex oxide ceramic and having both water repellency and an antibacterial/antiviral property.

DESCRIPTION OF EMBODIMENTS

Figure 1:
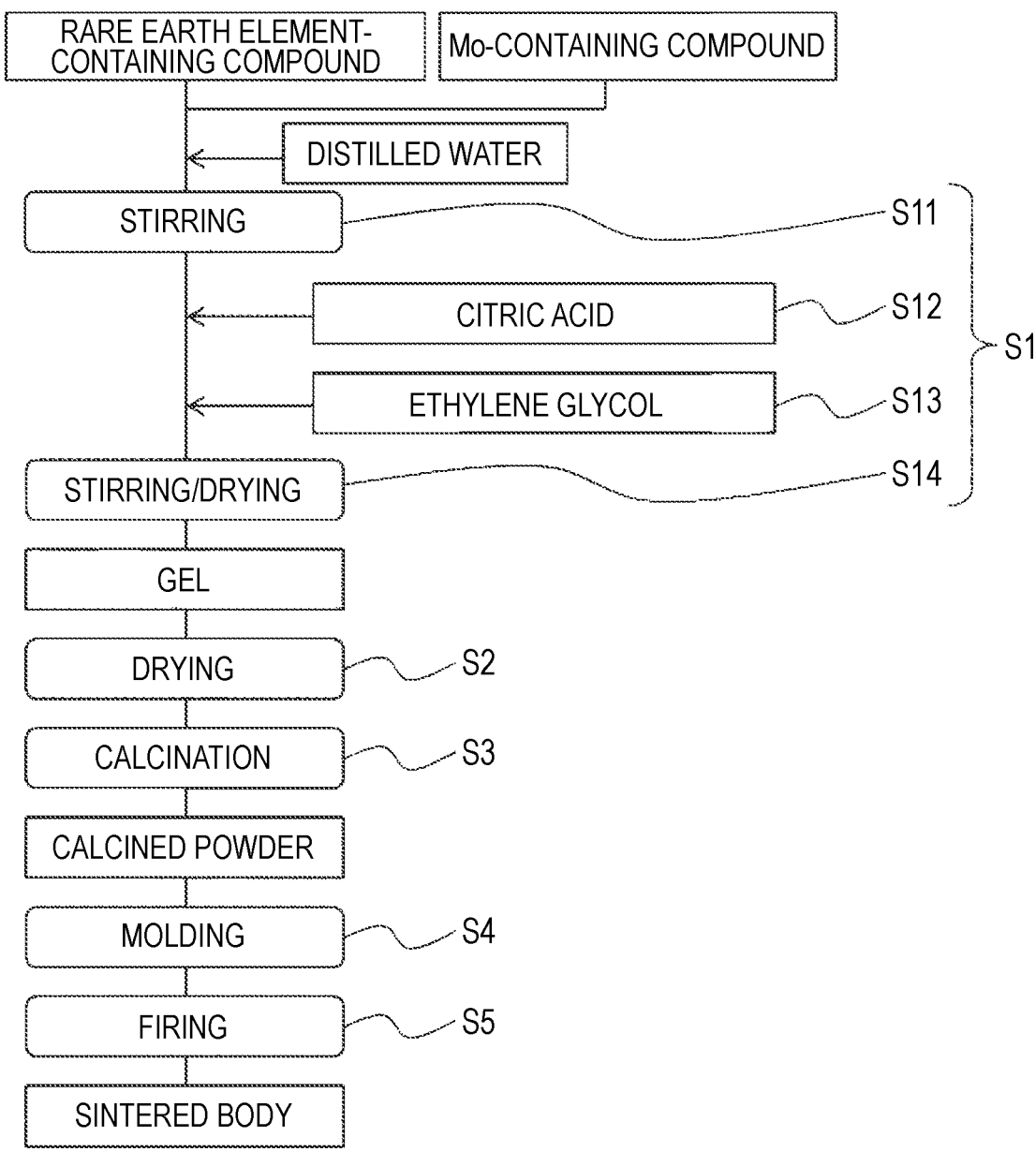
FIG. 1 A flowchart showing an example of a polymerizable complex method.

The complex oxide ceramic of the embodiment is a complex oxide ceramic containing a rare earth element and at least one element selected from among molybdenum, tungsten, and vanadium. The complex oxide ceramic of the embodiment is a ceramic produced by firing a complex oxide containing a rare earth element oxide and at least one member selected from among molybdenum oxide, tungsten oxide, and vanadium oxide, and has self-water repellency and an antibacterial/antiviral property.

The complex oxide ceramic of the present embodiment exerts an antibacterial/antiviral property conceivably by virtue of the presence of at least one element selected from among molybdenum, tungsten, and vanadium. Although no precise mechanism of exerting water repellency of the complex oxide ceramic of the present embodiment has been elucidated, a possible mechanism is as follows. Specifically, as compared with conventional metal oxides such as titanium oxide, rather than water in the air, organic matter preferentially adsorbs on the surface of the complex oxide ceramic of the embodiment, to thereby attain water repellency.

As shown in the below-mentioned Examples, the complex oxide ceramic of the embodiment exhibits excellent durability in water repellency. That is, the water repellency is recovered over time, even when the ceramic has been subjected to hydrophilization with ozone. In addition, since the amount of ions leaked from the complex oxide ceramic of the embodiment is small, the antibacterial/antiviral property lasts for a long period. Thus, the complex oxide ceramic of the embodiment exhibits both self-water repellency and an antibacterial/antiviral property, which properties are highly consistent over time.

The complex oxide ceramic of the embodiment essentially contains a rare earth element and at least one element selected from among molybdenum, tungsten, and vanadium, and generally further contains oxygen atoms. So long as the effects of the present embodiment are not impaired, the ceramic may further contain other elements. Hereinafter, the components of the complex oxide ceramic will be described.

The complex oxide ceramic of the embodiment contains a rare earth element. Generally, the rare earth element is contained as an oxide thereof. In the present embodiment, the term "rare earth element" collectively refers to Sc (scandium), Y (yttrium), and lanthanoids (elements of atomic numbers of 57 to 71). These rare earth elements may be selected therefrom and used singly or in combination of two or more species. In the present embodiment, from the view point of water repellency, the rare earth element preferably includes a lanthanoid element. More preferably, the rare earth element includes at least one element selected from among La (lanthanum), Ce (cerium), and Gd (gadolinium). Also, from the viewpoint of the antibacterial/antiviral property, the rare earth element preferably includes La or Ce, particularly preferably La. By virtue of the combination of La and Mo, an excellent antibacterial/antiviral property can be attained.

The complex oxide ceramic of the embodiment also contains at least one element selected from among Mo (molybdenum), W (tungsten), and V (vanadium). Generally, Mo, W, and V are contained as oxides thereof. When the complex oxide ceramic of the embodiment contains at least one member selected from among a molybdate salt, a tungstate salt, and a vanadate salt, an antibacterial/antiviral property can be exerted.

In the present embodiment, no particular limitation is imposed on the ratio of element A content to element B content (element A: rare earth element, element B: at least one element selected from among Mo, W, and V), and the ratio may be appropriately tuned in accordance with the use of the complex oxide ceramic. From the viewpoint of achieving both water repellency and an antibacterial/antiviral property, the ratio by mole of element A to element B is preferably 1:9 to 9:1, more preferably 3:7 to 7:3, particularly preferably 1:1.

A preferred embodiment of the complex oxide ceramic has a chemical composition represented by $(La_{2-x}Ce_x)(Mo_{2-y}W_y)O_9$ (x=0 to 2, y=0 to 2).

A more preferred embodiment of the complex oxide ceramic has a chemical composition represented by $La_2(Mo_{2-y}W_y)O_9$ (y=0 to 2).

Examples of the chemical composition of the complex oxide ceramic of the embodiment include $La_2Mo_2O_9$, $La_2W_2O_9$, $La_2(Mo_{0.5}W_{1.5})O_9$, $La_2MoWO_9$, $La_2(Mo_{1.5}W_{0.5})O_9$, and $La_{1.8}Ce_{0.2}Mo_2O_9$.

So long as the effects of the present embodiment are not impaired, the complex oxide ceramic of the embodiment may further contain other elements, for example, transition metal elements. Any of the transition metal elements may be contained as an oxide thereof or in form other than oxide.

In the present embodiment, the ratio of other element amount with respect to the entire amount of the complex oxide ceramic containing the relevant element(s) is preferably 20 mass % or less, more preferably 10 mass % or less, still more preferably 5 mass % or less.

The complex oxide ceramic of the embodiment may be a single-crystal form or a polycrystalline form, or may be amorphous such as vitreous. Alternatively, the ceramic may include a crystalline portion and a non-crystalline portion. The crystal phase may be a single phase, or a combination phase of two or more different phases.

No particular limitation is imposed on the shape of the complex oxide ceramic of the embodiment, and the ceramic may be formed into a shape of interest in accordance with the use. For example, through the below-mentioned technique, the ceramic may be sintered to form a sintered body having a shape of interest, or the sintered body may be pulverized to yield a powder. A calcined powder, which is produced before sintering in the below-mentioned production method, also corresponds to an embodiment of the complex oxide ceramic having self-water repellency and an antibacterial/antiviral property. By use of the complex oxide ceramic of the embodiment in the form of powder, the surface area (per mass) of the ceramic increases, whereby the antibacterial/antiviral property can be efficiently attained.

The present embodiment can also provide an article provided with the complex oxide ceramic on at least a part of the surface thereof. The surface of the article contains the complex oxide ceramic and exhibits water repellency and an antibacterial/antiviral property. The article of the present embodiment is applicable to any articles for which water repellency and an antibacterial/antiviral property are required. Examples of the article include housings of electronic devices such as personal computers and smartphones; water sections such as bathroom, lavatory, and kitchen; and medical goods such as masks and white coats. In the present embodiment, a part of the surface of the article may be formed of a sintered body of the complex oxide ceramic, or a powder of the complex oxide ceramic may be deposited on the surface of the article.

The method for depositing a powder of the complex oxide ceramic on the surface of the article is appropriately selected in accordance with the type of the article. In one procedure, a powder of the complex oxide ceramic is sprayed onto the surface of the article through an aerosol deposition method, to thereby form a complex oxide ceramic film. In another procedure, a powder of the complex oxide ceramic, a known binder resin, a solvent, etc. are mixed, to prepare an ink or a paste, which is applied onto the surface of the article of interest, to thereby form a film containing the complex oxide ceramic. No particular limitation is imposed on the application method, and there may be employed application methods such as spray coating, dip coating, and spin coating, or printing methods such as flexo printing, screen printing, and ink-jet printing. In an alternative mode, a powder of the complex oxide ceramic of the embodiment is mixed with resin, and the resin mixture molded, to thereby from an article of interest.

Also, there may be formed a stacked body provided with a film containing the complex oxide ceramic of the embodiment. In this case, a substrate made of resin film, paper, glass, metal, etc. is provided, and the film is provided on the substrate through any of the aforementioned methods. The stacked body may further be attached to any article.

When the powder of the complex oxide ceramic is applied onto a fabric substrate or a non-woven fabric substrate through any of the aforementioned methods, a mask, a white coat, etc. exhibiting excellent water repellency and antibacterial/antiviral property can be produced. Alternatively, the complex oxide ceramic of the embodiment may be used by mixing with a photocatalyst (e.g., titanium oxide).

As shown in the below-mentioned Example, as compared with known metal oxides, organic matter tends to preferentially adsorb on the surface of the complex oxide ceramic of the embodiment. For example, in the complex oxide ceramic of the embodiment, the ratio of carbon to the sum of the rare earth element (element A) and the at least one element selected from among molybdenum, tungsten, and vanadium (element B) is 1.7 atm % to 2.1 atm %. Conceivably, such a ratio induces water repellency. In the complex oxide ceramic of the embodiment, the water contact angle of the surface is, for example, 88° to 119°. In addition to the aforementioned water repellency, the complex oxide ceramic of the embodiment also exhibits an excellent antibacterial/antiviral property, which is attributed to the antibacterial/antiviral activity of at least one member selected from among a molybdate salt, a tungstate salt, and a vanadate salt. Specifically, in the complex oxide ceramic of the embodiment, the percent bacterial or viral reduction as measured after passage of 6 hours through the film cover method is, for example, 99% or greater.

No particular limitation is imposed on the method for producing the complex oxide ceramic of the embodiment. In one mode of the production method, a complex oxide containing a rare earth element and at least one element selected from among molybdenum, tungsten, and vanadium is formed, and the formed complex oxide is fired. Examples of preferred production methods include, in particular, a polymerizable complex method and a precipitation method, which are described below. However, the below-mentioned solid-phase reaction method and other production methods may also be employed. Next, the polymerizable complex method, the precipitation method, and the solid-phase reaction method will be described.

<Polymerizable Complex Method>

With reference to FIG. 1, the polymerizable complex method will be described. FIG. 1 is a flowchart showing an example of the polymerizable complex method. Notably, the method will be described hereinafter, taking molybdenum as an example of the at least one element selected from among molybdenum, tungsten, and vanadium.

The polymerizable complex method of the embodiment includes a gelating step (S1) including adding a hydroxycarboxylic acid and a glycol to an aqueous solution containing a rare earth element-containing compound and a molybdenum-containing compound, and then heating to cause esterification reaction between the hydroxycarboxylic acid and the glycol, to thereby induce gelation;
  a drying step (S2) of drying a gel formed in the gelating step;
  a calcining step (S3) of calcining a powder obtained by drying the gel;
  a molding step (S4) of molding the calcined powder; and
  a firing step (S5) of firing a compact formed through the molding step.

According to the polymerizable complex method, a complex oxide ceramic having high uniformity and density can be produced at relatively low temperature, which is one advantage of the invention.

In the gelating step (S1), firstly, water is added to a rare earth element-containing compound and a molybdenum-containing compound, which are soluble in water, to thereby prepare an aqueous solution (S11). Subsequently, a hydroxycarboxylic acid is added to the thus-prepared aqueous solution, to thereby form a metal-hydroxycarboxylic acid complex (S12). Then, a glycol is added thereto (S13), to thereby cause esterification reaction between the hydroxycarboxylic acid and the glycol, to thereby induce gelation (S14).

Examples of the rare earth element-containing compound which is soluble in water include rare earth nitrate salts. Examples of the molybdenum-containing compound which is soluble in water include ammonium molybdate. In one possible mode, lanthanum nitrate hexahydrate (La$(NO_3)_3 \cdot 6H_2O$) is used as the rare earth element-containing compound, and ammonium molybdate tetrahydrate ($(NH_4)_6Mo_7O_{24} \cdot 4H_2O$) is used as the molybdenum-containing compound.

Examples of the hydroxycarboxylic acid include citric acid, and examples of the glycol include ethylene glycol and propylene glycol.

The thus-obtained gel is sufficiently dried in the drying step (S2). No particular limitation is imposed on the drying method, and heat drying is preferred. Subsequently, a powder obtained by drying the gel is calcined (calcining step: S3). No particular limitation is imposed on the mode of calcination, but calcination is preferably performed at 500° C. or higher. No particular limitation is imposed on the atmosphere of calcination, and calcination may be performed in the air. In the case where the calcined powder per se is used as the complex oxide ceramic of the embodiment, from the viewpoint of enhancement in water repellency, calcination is preferably performed in an atmosphere having a water content of 1,000 ppm or lower and an organic substance concentration of 1,000 ppm or lower, and containing oxygen in an amount of 0.1% or greater. Since the thus-obtained powder may be partially sintered in some cases, the powder may be pulverized to form a micropowder, if needed. No particular limitation is imposed on the pulverization method, but pulverization is preferably performed under dry conditions. No particular limitation is imposed on the type and other conditions of the crusher, and the apparatus may be appropriately selected from known crushers.

Thereafter, the powder obtained through calcination (i.e., calcined powder) is molded into a shape of interest (molding step: S4). No particular limitation is imposed on the molding method, and the method may be appropriately selected from known molding methods such as uniaxially pressing.

Then, the thus-obtained compact is fired, to thereby form a sintered body of the complex oxide ceramic (firing step: S5). No particular limitation is imposed on the firing method. From the viewpoint of yielding a sintered body having excellent water repellency, one preferred method is, for example, a method including heating the compact at about 900° C. in an atmosphere having a water content of 1,000 ppm or lower (preferably 100 ppm or lower) and an organic substance concentration of 1,000 ppm or lower (preferably 100 ppm or lower), and containing oxygen in an amount of 0.1% or greater.

<Precipitation Method>

Figure 2:
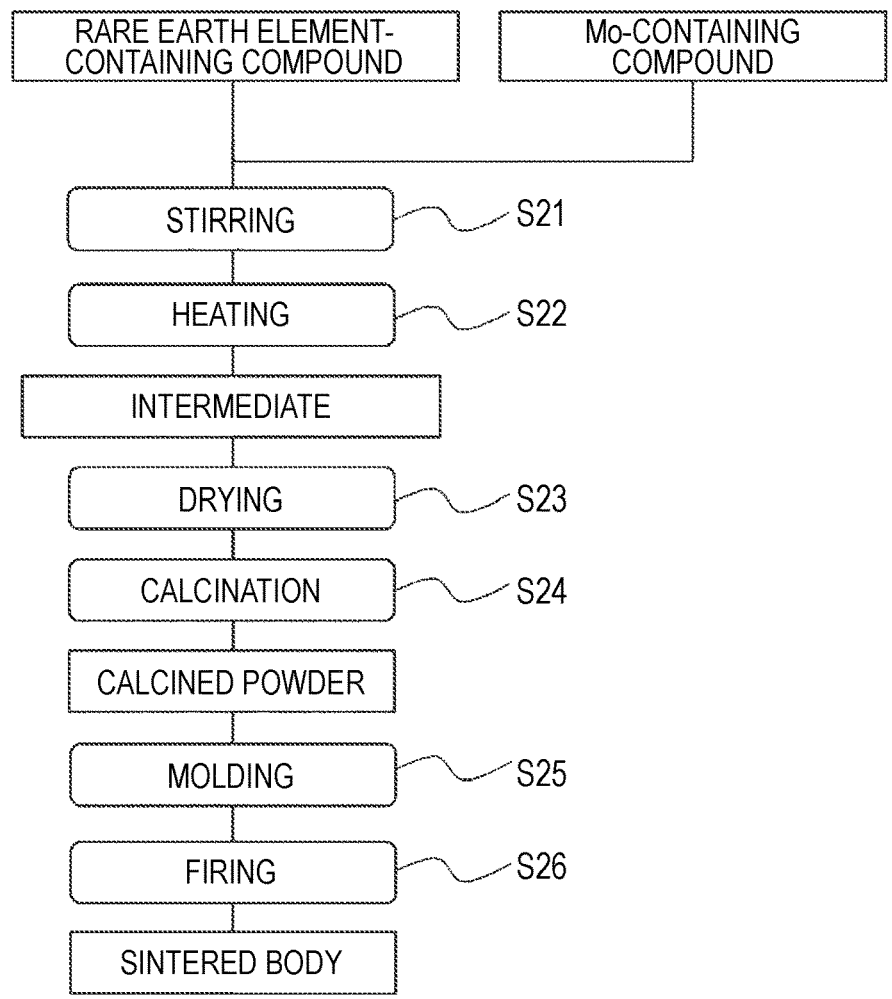
FIG. 2 A flowchart showing an example of a precipitation method.

A precipitation method will next be described as another method for producing the complex oxide ceramic. FIG. 2 is a flowchart showing an example of the precipitation method. Notably, the method will be described hereinafter, taking molybdenum as an example of the at least one element selected from among molybdenum, tungsten, and vanadium.

The precipitation method of the present embodiment includes a step of stirring an aqueous solution containing a rare earth element-containing compound and a molybdenum-containing compound (S21), and heating the mixed solution for reaction, to thereby form an intermediate (S22);

a drying step of (S23) drying the thus-obtained intermediate;

a calcining step (S24) of calcining the powder obtained through drying the intermediate;

a molding step (S25) of molding the calcined powder; and a firing step (S26) of firing a compact formed through the molding step.

According to the precipitation method, a complex oxide ceramic having high uniformity and density can be produced at relatively low temperature, which is one advantage of the invention.

More specifically, firstly, a rare earth element-containing compound which is soluble in water is dissolved in distilled water, to thereby prepare a rare earth element-containing aqueous solution. Separately, a molybdenum-containing compound which is soluble in water is dissolved in distilled water, to thereby prepare an aqueous molybdenum-containing solution. Then, these aqueous solutions are mixed and stirred at ambient temperature (S21). Thereafter, the mixed aqueous solution is heated for a specific time (S22), to thereby yield an intermediate.

Examples of the rare earth element-containing compound which is soluble in water include rare earth nitrate salts. Examples of the molybdenum-containing compound which is soluble in water include ammonium molybdate. In one possible mode, lanthanum nitrate hexahydrate (La$(NO_3)_3 \cdot 6H_2O$) is used as the rare earth element-containing compound, and ammonium molybdate tetrahydrate (($NH_4)_6Mo_7O_{24} \cdot 4H_2O$) is used as the molybdenum-containing compound.

The thus-obtained intermediate is sufficiently dried in the drying step (S23). No particular limitation is imposed on the drying method, and heat drying is preferred. Subsequently, a dried intermediate (powder) is calcined, to thereby form a calcined powder (calcining step: S24). No particular limitation is imposed on the mode of calcination, but calcination is preferably performed at 500° C. or higher. No particular limitation is imposed on the atmosphere of calcination, and calcination may be performed in the air. In the case where the calcined powder per se is used as the complex oxide ceramic of the embodiment, from the viewpoint of enhancement in water repellency, calcination is preferably performed in an atmosphere having a water content of 1,000 ppm or lower and an organic substance concentration of 1,000 ppm or lower, and containing oxygen in an amount of 0.1% or greater. Since the thus-obtained powder may be partially sintered in some cases, the powder may be pulverized to form a micropowder, if needed. No particular limitation is imposed on the pulverization method, but pulverization is preferably performed under dry conditions. No particular limitation is imposed on the type and other conditions of the crusher, and the apparatus may be appropriately selected from known crushers.

Thereafter, the powder obtained through calcination (i.e., calcined powder) is molded into a shape of interest (molding step: S25). No particular limitation is imposed on the molding method, and the method may be appropriately selected from known molding methods such as uniaxially pressing.

Then, the thus-obtained compact is fired, to thereby form a sintered body of the complex oxide ceramic (firing step: S26). No particular limitation is imposed on the firing method. From the viewpoint of yielding a sintered body having excellent water repellency, one preferred method is, for example, a method including heating the compact at about 900° C. in an atmosphere having a water content of 1,000 ppm or lower (preferably 100 ppm or lower) and an organic substance concentration of 1,000 ppm or lower (preferably 100 ppm or lower), and containing oxygen in an amount of 0.1% or greater.

<Solid-Phase Reaction Method>

Next, another complex oxide ceramic production method will be described. The method is a solid-phase reaction method. In the solid-phase reaction method, a powder of a rare earth element-containing compound and a powder of molybdenum oxide ($MoO_3$), serving as raw materials, are mixed together, and the mixture is calcined, to thereby prepare a calcined powder. As the rare earth element-containing compound serving as a raw material, a rare earth element oxide such as lanthanum oxide ($La_2O_3$) may be used. Molybdenum oxide may be obtained through pyrolysis of, for example, ammonium molybdate powder. When a mixture of the rare earth element-containing compound and ammonium molybdate is calcined at a temperature, for example, 900° C. or higher, a powder of a lanthanum molybdate single phase is yielded. The same atmosphere as employed in the polymerizable complex method may be employed in calcination and firing. Also, the same molding method as employed in the polymerizable complex method may be employed. Thus, detailed description of the atmosphere and molding method will be omitted.

Then, the thus-obtained compact is fired in the firing step, to thereby form a sintered body of the complex oxide ceramic. No particular limitation is imposed on the firing method. From the viewpoint of yielding a sintered body having excellent water repellency, one preferred method is, for example, a method including heating the compact at about 1,200° C. in an atmosphere having a water content of 1,000 ppm or lower (preferably 100 ppm or lower) and an organic substance concentration of 1,000 ppm or lower (preferably 100 ppm or lower), and containing oxygen in an amount of 0.1% or greater.

EXAMPLES

The present embodiment will next be described in detail by way of Examples, which should not be construed as limiting the embodiment thereto.

Example 1: LMO (Polymerizable Complex Method)

A complex oxide ceramic ($La_2Mo_2O_9$ (LMO)) of Example 1 was produced through the polymerizable complex method shown in the flowchart of FIG. 1. Firstly, an aqueous solution of lanthanum nitrate hexahydrate (La$(NO_3)_3 \cdot 6H_2O$) and an aqueous solution of ammonium molybdate tetrahydrate (($NH_4)_6Mo_7O_{24} \cdot 4H_2O$) were provided. The two aqueous solutions were mixed so that the mole ratio of La to Mo was adjusted to 1:1 (S11). The solution mixture was heated at 80° C., and then aqueous citric acid was added thereto so that the mole ratio of the sum of La and Mo to citric acid was adjusted to 1:2 (S12). Subsequently, an ethylene glycol solution was added thereto so that the ratio in amount of ethylene glycol to citric acid was adjusted to ⅔ equivalents (S13). The resultant mixture was maintained at 80° C. under stirring in a thermostat bath for 6 hours, to thereby prepare a gel (S14).

The gel was dried at 200° C. for 24 hours, to thereby yield a dry powder (S2). Portions (about 1.0 g/portion) of the thus-obtained dried powder were each subjected to dry pulverization for 10 minutes by means of an agate mortar and a pestle. The pulverization product was calcined by placing in air at 500° C. for 12 hours (S3), to thereby form a calcined powder of a complex oxide ceramic (La$_2$Mo$_2$O$_9$ (LMO)). Portions (about 1.0 g/portion) of the thus-obtained calcined powder were each subjected to dry pulverization for 10 minutes by means of an agate mortar and a pestle. The calcined powder was divided and weighed to portions (about 0.15 g/portion). Ethylene glycol serving as a molding aid was added in an amount of about 2% by volume to each portion with mixing for 10 minutes. The mixture was caused to pass through a polyester sieve, and the powder was press-molded in a metal mold (diameter: 1 cm) by means of a hydraulic press machine at 100 MPa for 3 minutes, to thereby yield a compact (S4). The compact was fired at 900° C. for 12 hours, under the flow of mimetic air (purity 99.9%, N$_2$: about 80%, O$_2$: about 20%, water content: 1,000 ppm or less, and organic substance concentration: 1,000 ppm or less) at 1 L/minute (S5), to thereby yield a sintered body of LMO. The obtained sintered body was found to have a single phase of α-LMO (monoclinic) and a relative density of 96%.

Comparative Example 1

Powder of 3% yttrium (Y)-containing zirconium dioxide (ZrO$_2$) (hereinafter may be referred to as YSZ) (TZ-3Y, product of Tosoh Corp.) was dried at 200° C. The dried powder was molded into a compact in the same manner as employed in Example 1, to thereby yield a sintered body of YSZ.

Comparative Example 2

The procedure of Comparative Example 1 was repeated, except that aluminum oxide (Al$_2$O$_3$) powder (Taimicron TM-DAR, product of Taimei Chemicals Co., Ltd.) was used instead of YSZ powder, to thereby yield a sintered body of Al$_2$O$_3$.

<Evaluation of Water Repellency>

Each of the sintered bodies produced in Example 1 and Comparative Examples 1 and 2 was placed in the dark for 600 hours. The change in contact angle and the amount of carbon on the surface of the sintered body were monitored in the following manner.

(Method of Measuring Contact Angle)

Figure 3:
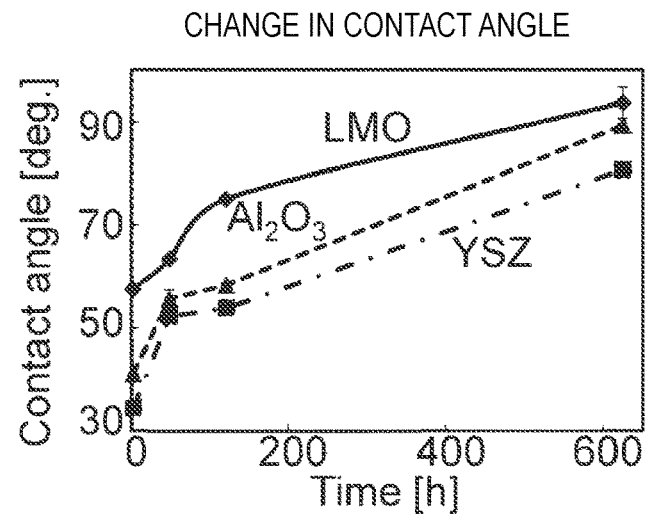
FIG. 3 A graph showing changes in contact angle in Example 1 (LMO: polymerizable complex method) and Comparative Examples 1 and 2.

The contact angle (water contact angle) was measured by means of a contact angle meter (Dropmaster 500, product of Kyowa Interface Science Co., Ltd.). Distilled water (3 µL) was added dropwise to a sample, and the angle was measured through the θ/2 method. FIG. 3 shows the results.

(Method of Measuring Surface Carbon Amount)

Figure 4:
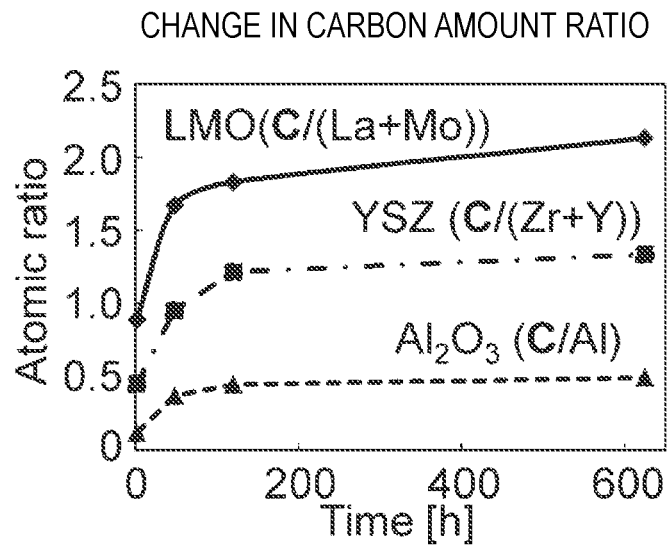
FIG. 4 A graph showing changes in surface carbon amount in Example 1 (LMO: polymerizable complex method) and Comparative Examples 1 and 2.

The amount of carbon at the surface of the oxide was determined by means of an XPS (X-ray Photoelectron Spectrometer 5500MT, product of Perkin Elmer) under the following conditions. FIG. 4 shows the results.

Excitation X-ray: AlKα300W-14 kV (continuous X-rays)
Neutralization: charge correction by an electron gun
Survey measurement path energy: 187.85 eV, step width of 0.8 eV, integration number of 3, repetition no. of 10, and range of 0 to 1,000 eV
Multiplex measurement path energy: 23.50 eV, step width of 0.2 eV
Assay Elements
LMO: La, Mo, O, C
Al$_2$O$_3$: Al, O, C
YSZ: Y, Zr, O, C <Evaluation of Water Repellency Durability>

Figure 5:
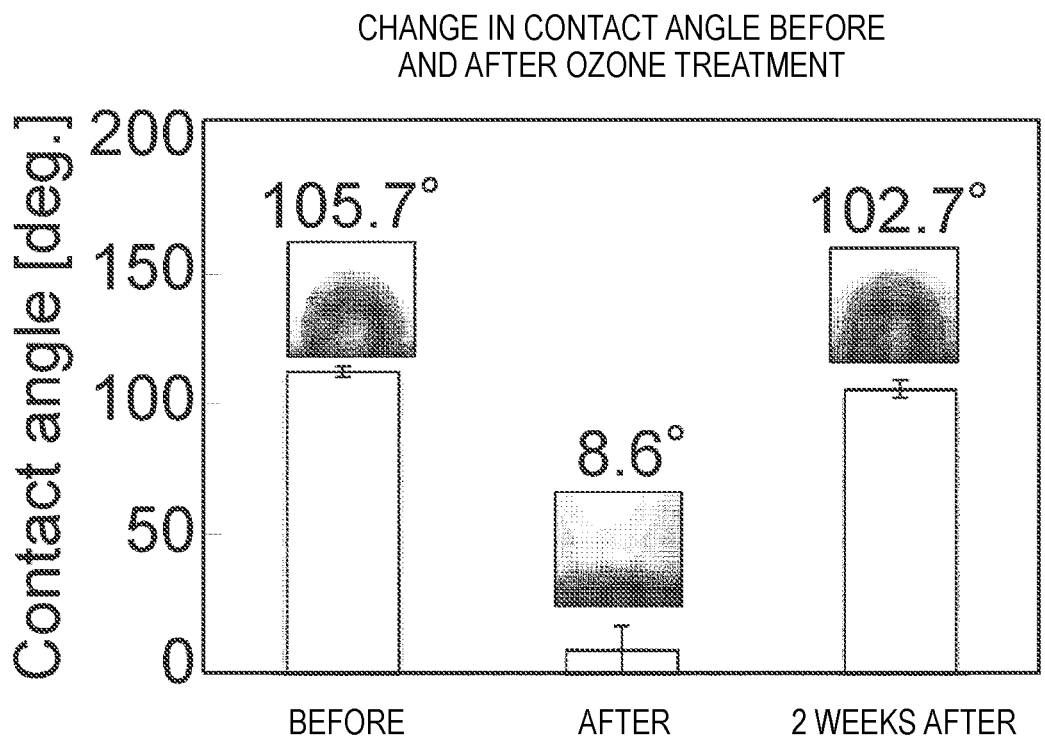
FIG. 5 A graph showing a change in contact angle of a complex oxide ceramic of Example 1 (LMO: polymerizable complex method) before and after an ozone treatment.

The surface of the sintered body produced in Example 1 was exposed to ozone, to thereby hydrophilize the surface. Specifically, ozone was generated through vacuum ultraviolet radiation (172 nm) for 15 minutes, and hydrocarbon adsorbed on the surface of the sintered body was oxidized by oxidizing action of ozone (surface treatment). Water contact angle of the sample was measured before and after hydrophilization and 2 weeks after the hydrophilization. FIG. 5 shows the results.

As shown in FIG. 3, the sintered body of Example 1 exhibited a water repellency higher than that of Comparative Examples 1 and 2. In addition, the water repellency of the sintered body of Example 1 gradually increased, and the contact angle increased to 93° at a timing 600 hours after the treatment. Also, as shown in FIG. 4, the amount of carbon at the surface of the sintered body increased over time.

As shown in FIG. 5, after hydrophilization through exposure to ozone, the surface became hydrophobic again when the sample was stored in the dark. These results suggest that the water repellency of the complex oxide ceramic of the present embodiment is enhanced through adsorption of organic matter in the air.

<Antibacterial/Antiviral Property Evaluation>

Figure 6:
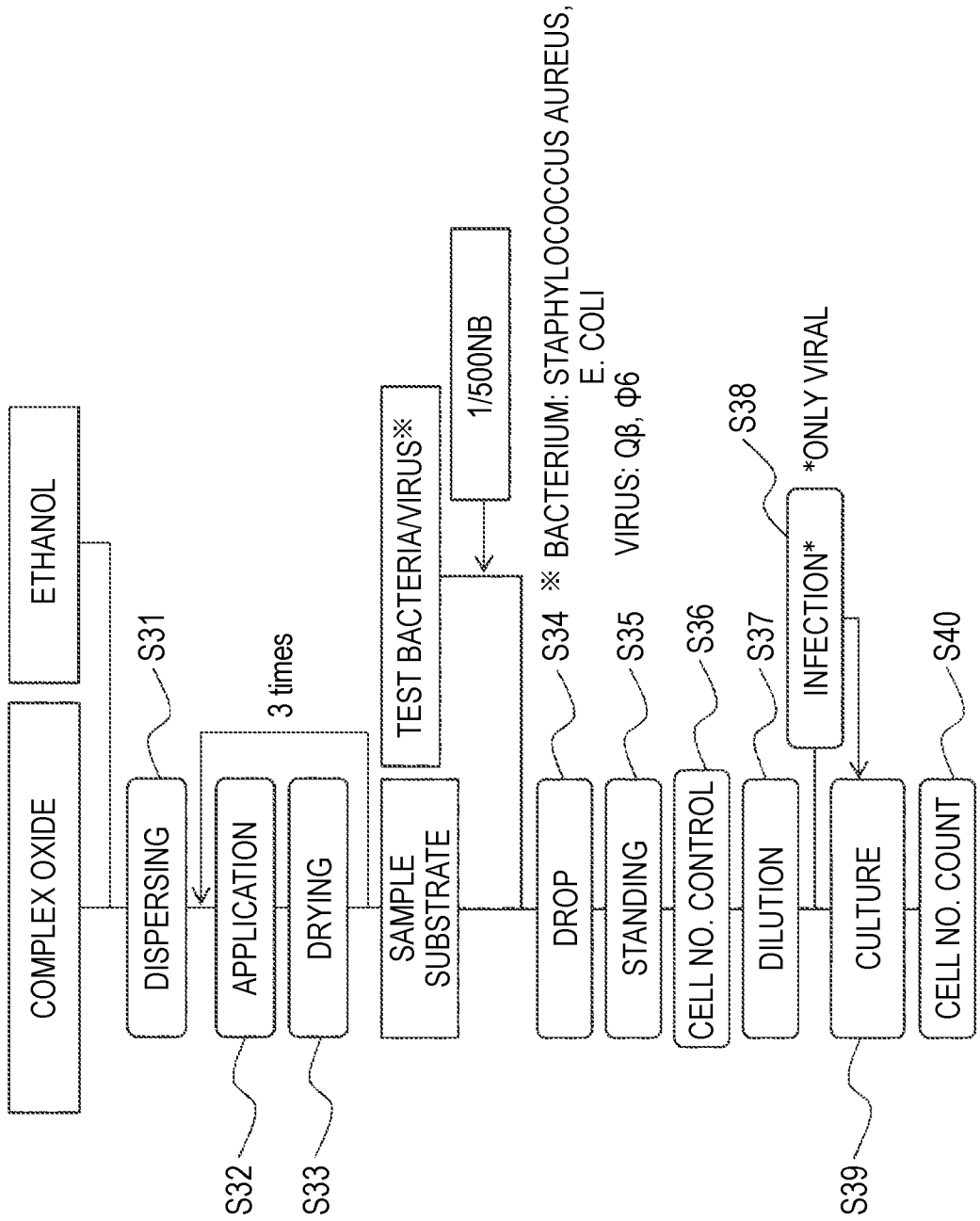
FIG. 6 A flowchart showing a procedure of evaluating an antibacterial/antiviral property.

With reference to FIGS. 6 and 7, the procedure of evaluating the antibacterial/antiviral property will be described. FIG. 6 is a flowchart showing the procedure of evaluating the antibacterial/antiviral property, and FIG. 7 is a sketch showing the method of evaluating the antibacterial/antiviral property.

The calcined powder prepared from the pulverized product of Example 1 was dispersed in ethanol, to thereby prepare a dispersion (1 mg/mL) (S31). The dispersion (150 µL) was applied to a glass substrate (2.5 cm×2.5 cm) (S32 and FIG. 7(a)), and the substrate was dried (S33). The set of application and drying was repeated thrice, and the substrate was sterilized. Thus, a plurality of test substrates were provided.

Separately, each of *Staphylococcus aureus* (Gram-positive) and *E. coli* (Gram-negative) was dissolved in a 1/500NB medium, to thereby prepare a test bacterial liquid having a concentration of about 2.2×10$^8$ CFU/mL. The liquid was 100-time diluted, to thereby prepare a solution having a concentration of about 2.0×10$^6$ CFU/mL. Also, each stock suspension of bacteriophage Qβ (substitute for norovirus) and bacteriophage φ6 (substitute for influenza virus) was diluted in a 1/500NB medium, to thereby prepare a test viral liquid having a concentration of about 2.0×10$^7$ PFU/mL.

(Antibacterial Test: *Staphylococcus aureus* and *E. coli*)

Figure 7A:
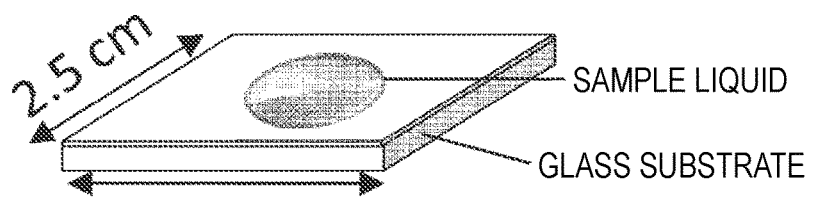
FIG. 7 A sketch showing a method of evaluating an antibacterial/antiviral property.
Figure 7B:
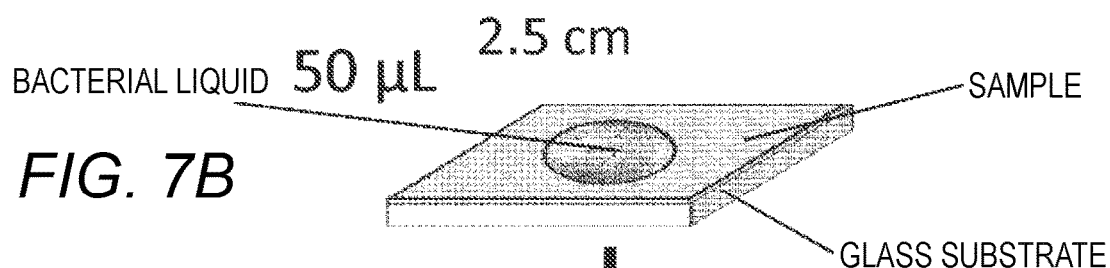
Figure 7C:
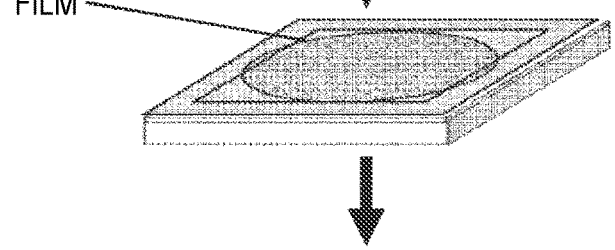
Figure 7D:
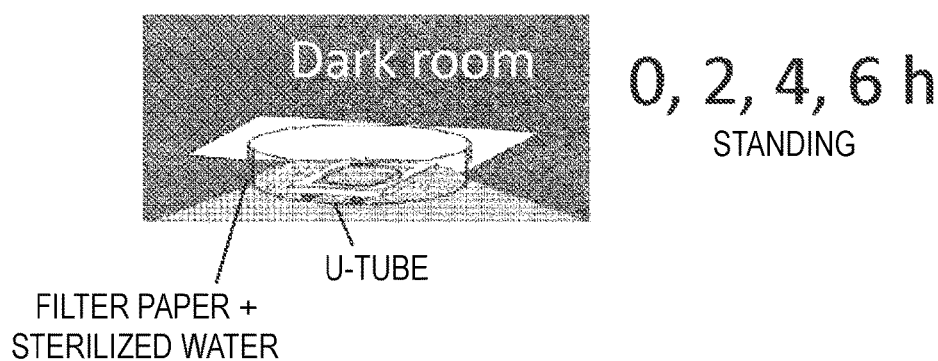

Onto each of the aforementioned test substrates, each bacterial suspension (50 µL, equivalent to about 10$^5$ CFU) was added dropwise (S34 and FIG. 7(b)), and the substrate was tightly covered by a film (FIG. 7(c)). Thereafter, the substrate was wrapped with aluminum foil and allowed to stand in the dark (S35 and FIG. 7(d)). In order to count the number of bacterial cells (colony number) remaining in the sample after passage of a predetermined time, growth of bacteria was inhibited by use of an SCDLP medium (S36), followed by dilution with PBS (S37). For correctly counting the colony number, a sample solution (1 mL), which was a bacterium-containing NA agar medium, was added thereto, and the substrate was allowed to stand for a predetermined time (S39). Thereafter, colony count was carried out, to thereby determine an antibacterial activity value (S40).

(Antiviral Test: Bacteriophage φ6 and Bacteriophage Qβ)

Onto each of the aforementioned test substrates, each phage suspension (50 µL, equivalent to about 10$^6$ PFU) was added dropwise (S34), and the substrate was tightly covered by a film. Thereafter, the substrate was wrapped with aluminum foil and allowed to stand in the dark (S35). In order to count the number of phage (plaque number) remaining in the sample after passage of a predetermined time, growth of viruses was inhibited by use of an SCDLP medium (S36), followed by dilution with 0.01M PBS (S37). Subsequently, diluted Qβ suspension was infected with *E. coli*, and φ6 one was infected with *Pseudomonas aeruginosa*, to thereby prepare solution samples (S38). Each sample was added to a dish in which an NA agar medium and additional NAN-KAN were present, and the dish was allowed to stand for a predetermined time (S39). Thereafter, the number of formed plaques was counted, to thereby determine an antiviral activity value (S40).

Comparative Examples 3 and 4

Lanthanum oxide ($La_2O_3$) particles and molybdenum oxide ($MoO_3$) particles were provided for Comparative Examples 3 and 4, respectively. In the antibacterial/antiviral property evaluation, the same procedure was repeated, except that the lanthanum oxide particles or molybdenum oxide particles were used instead of the calcined powder produced through pulverization in Example 1, to thereby carry out evaluation of the antibacterial/antiviral property.

Figure 8:
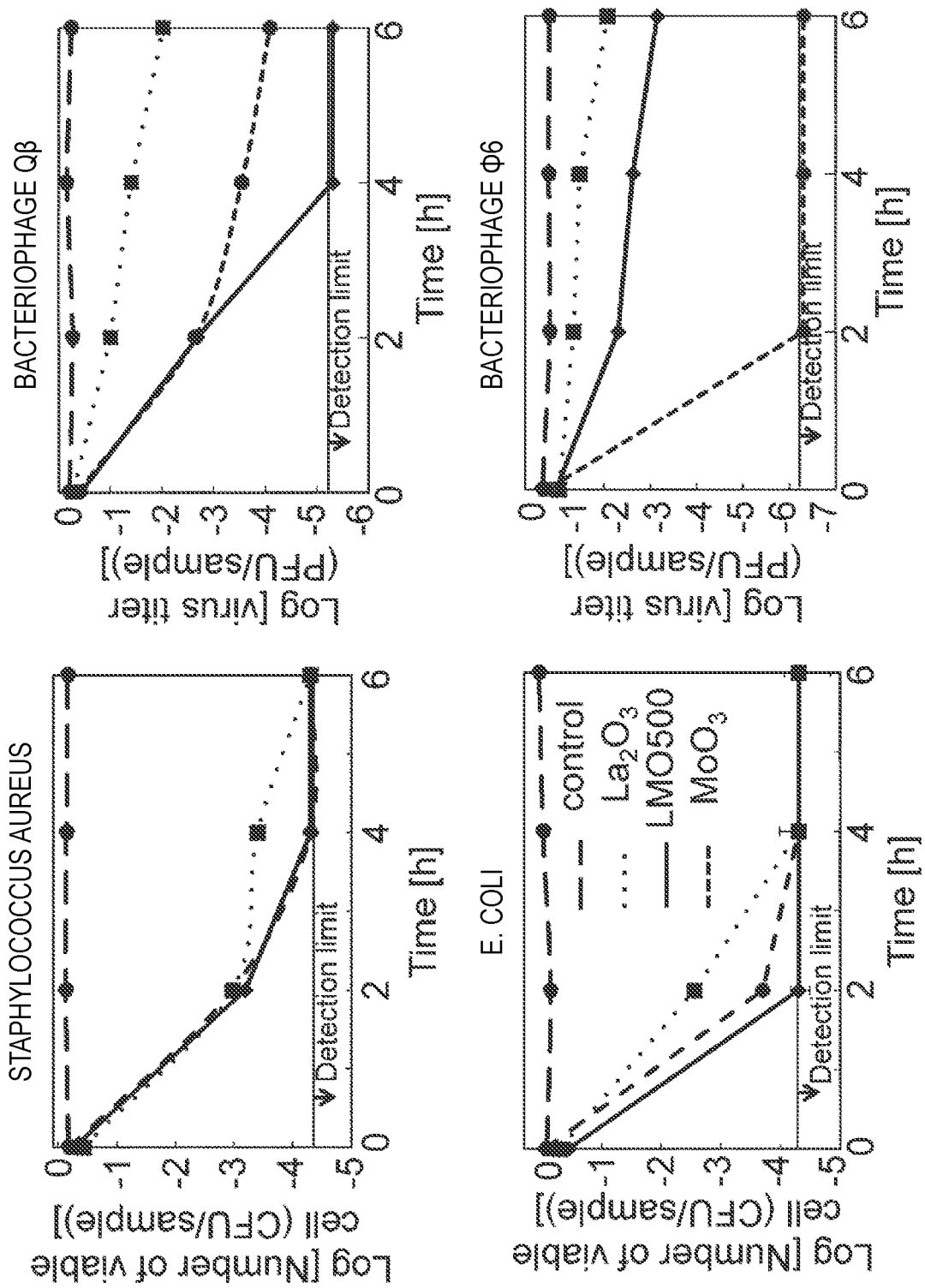
FIG. 8 Graphs each showing results of evaluation of an antibacterial/antiviral property in Example 1 (LMO: polymerizable complex method) and Comparative Examples 3 and 4.

FIG. 8 shows the results of the antibacterial test and antiviral test. In FIG. 8, the vertical axis of each graph represents logarithmic number of viable bacterial cells or a virus titer. In the case in which the number of viable cell and virus titer decreased by a logarithmic value of 2, the relevant sample was found to exhibit antibacterial/antiviral activity.

As is clear from FIG. 8, the complex oxide ceramic of Example 1 exhibited a decrease in survival rate by a logarithmic value of 2 or greater within 6 hours, with respect to all tested bacteria and viruses. Thus, the complex oxide ceramic of Example 1 was found to exhibit excellent antibacterial/antiviral activity. Molybdenum oxide exhibited favorable antibacterial/antiviral activity with respect to all tested bacteria and viruses. However, with respect to *E. coli* and Qβ, the complex oxide ceramic of Example 1 exhibited higher antibacterial/antiviral activity.

Example 2: LMO (Precipitation Method)

Through the precipitation method shown in the flowchart of FIG. 2, a complex oxide ceramic ($La_2Mo_2O_9$ (LMO)) of Example 2 was produced. Firstly, an aqueous solution of lanthanum nitrate hexahydrate ($La(NO_3)_3 \cdot 6H_2O$) (5.8 mmol) dissolved in distilled water (5 mL) and an aqueous solution of ammonium molybdate tetrahydrate (($NH_4)_6Mo_7O_{24} \cdot 4H_2O$) (0.82 mmol) dissolved in distilled water (50 mL) were provided. The two aqueous solutions were mixed at room temperature so that the mole ratio of La to Mo was adjusted to 1:1 (S21). Then, the solution mixture was maintained in a thermostat bath at 70° C. for 24 hours, to thereby prepare an intermediate (S22).

The intermediate was dried at 120° C. for 12 hours, to thereby yield a dry powder (S23). Portions (about 1.0 g/portion) of the thus-obtained dried powder were each subjected to dry pulverization for 10 minutes by means of an agate mortar and a pestle. The pulverization product was calcined by placing in air at 500° C. for 6 hours (S24), to thereby form a calcined powder of a complex oxide ceramic ($La_2Mo_2O_9$ (LMO)). The obtained calcined powder was found to have a single phase of LMO and a specific surface area of 5.8 m²/g.

Portions (about 1.0 g/portion) of the thus-obtained calcined powder were each subjected to dry pulverization for 10 minutes by means of an agate mortar and a pestle. The calcined powder was divided and weighed to portions (about 0.15 g/portion). Ethylene glycol serving as a molding aid was added in an amount of about 2% by volume to each portion with mixing for 10 minutes. The mixture was caused to pass through a polyester sieve, and the powder was press-molded in a metal mold (diameter: 1 cm) by means of a hydraulic press machine at 100 MPa for 3 minutes, to thereby yield a compact (S25). The compact was fired at 900° C. for 12 hours in the air (S26), to thereby yield a sintered body of LMO. The obtained sintered body was found to have a single phase of α-LMO (monoclinic) and a relative density of 95%.

Figure 9:
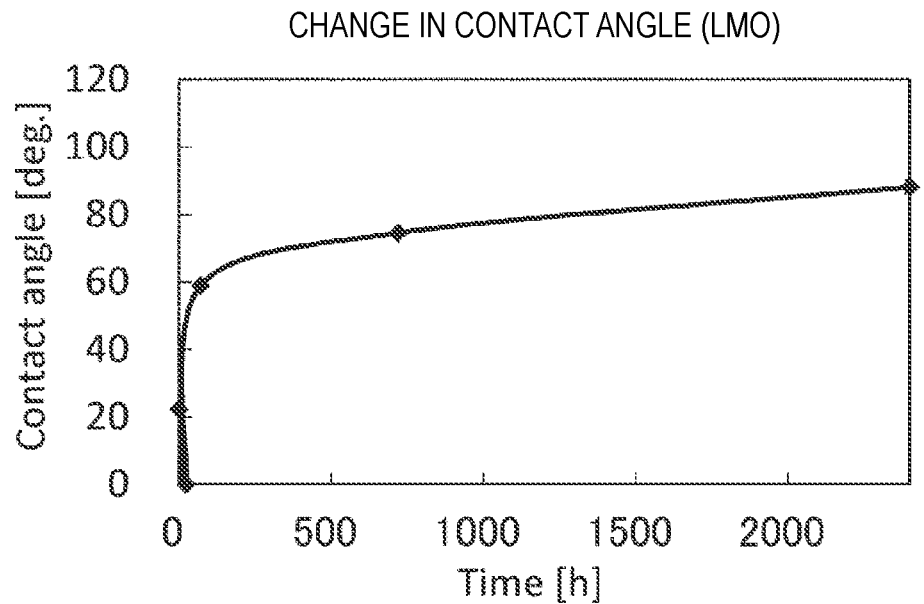
FIG. 9 A graph showing changes in contact angle in Example 2 (LMO: precipitation method).

The change over time in contact angle of the thus-produced LMO of Example 2 was determined through the same measurement method as employed in the aforementioned contact angle measurement method. FIG. 9 shows the results of contact angle measurement. As shown in FIG. 9, the LMO of Example 2 was found to also exhibit high water repellency. In addition, the water repellency of the LMO of Example 2 gradually increased, and the contact angle increased to 88° at a timing 2,400 hours after the treatment.

Figure 10:
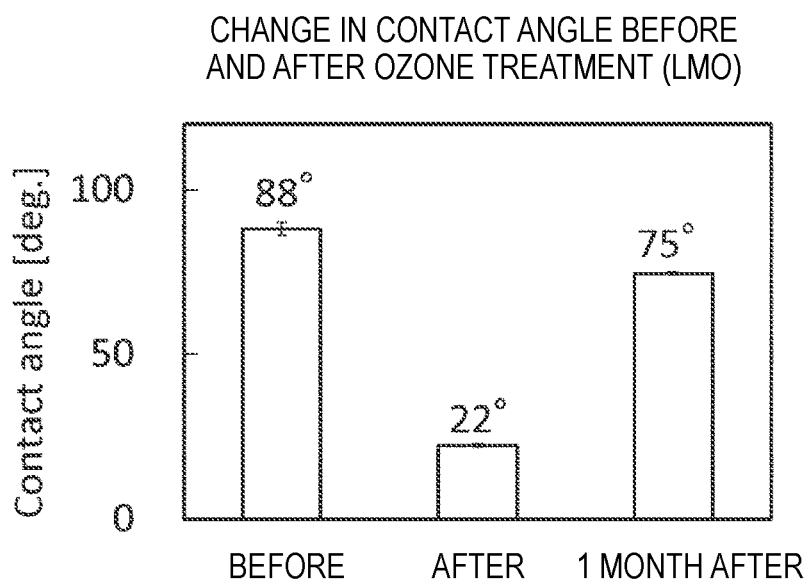
FIG. 10 A graph showing a change in contact angle in Example 2 (LMO: precipitation method) before and after an ozone treatment.

Also, the change in contact angle of the LMO of Example 2 before and after the ozone treatment was determined through the same measurement method as employed in the aforementioned contact angle measurement method. FIG. 10 shows the results of contact angle measurement. As shown in FIG. 10, after hydrophilization through exposure to ozone, the surface became hydrophobic again when the LMO of Example 2 was stored in the dark. These results suggest that the water repellency of the LMO of Example 2 is also enhanced through adsorption of organic matter in the air.

The above tests results have revealed that the LMO of Example 2 produced through the precipitation method also exhibits water repellency, similar to the case of the LMO of Example 1 produced through the polymerizable complex method.

Figure 11:
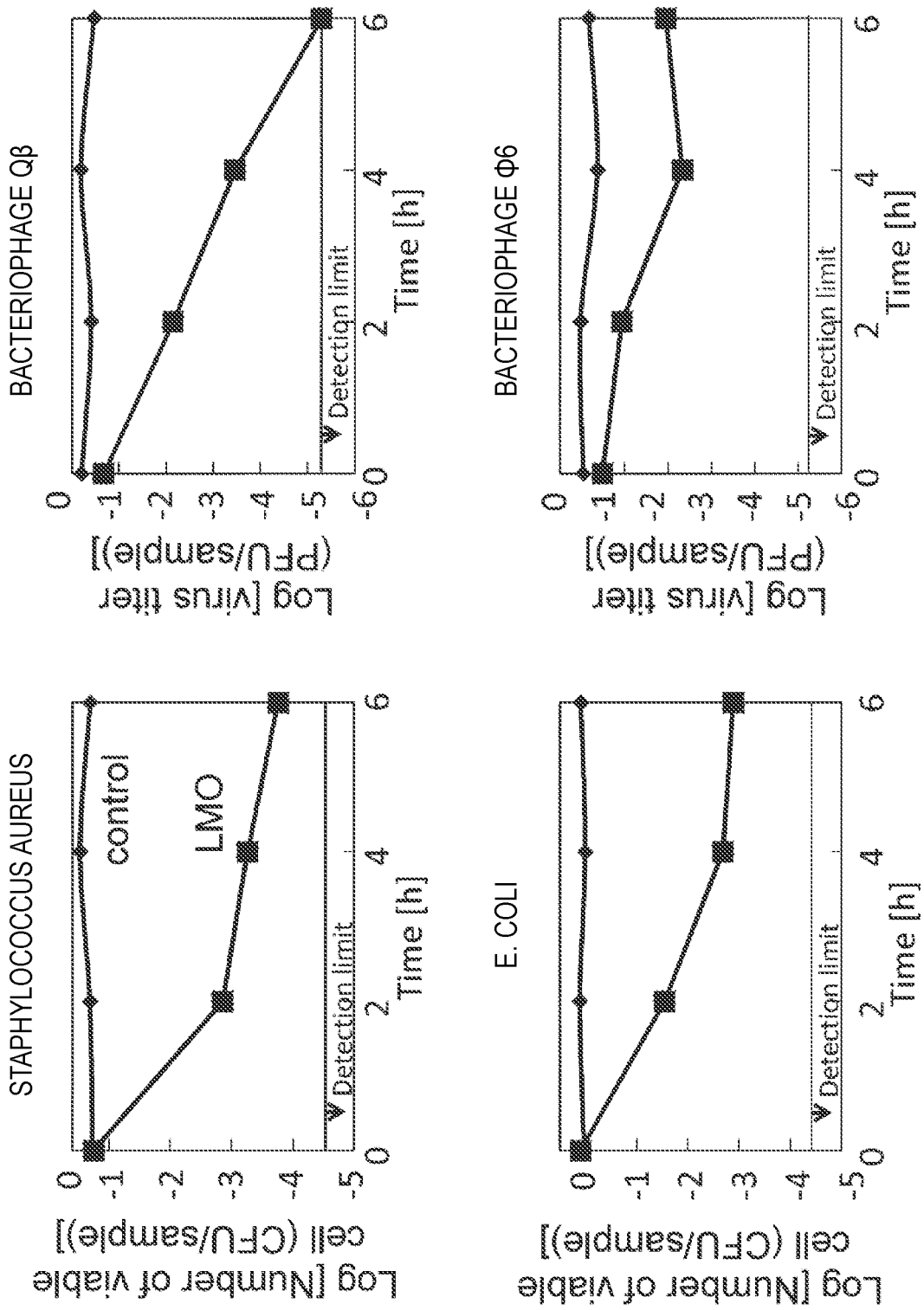
FIG. 11 Graphs each showing results of evaluation of an antibacterial/antiviral property in Example 2 (LMO: precipitation method).

Further, the antibacterial/antiviral property of the LMO of Example 2 was evaluated through the same method as employed in the above-described method. FIG. 11 shows the evaluation results of the antibacterial/antiviral property of the LMO of Example 2. As is clear from FIG. 11, the LMO of Example 2 exhibited a decrease in survival rate by a logarithmic value of 2 or greater within 6 hours, with respect to all tested bacteria and viruses. Thus, the LMO of Example 2 was found to exhibit excellent antibacterial/antiviral activity.

Example 3: LWO (Precipitation Method)

Through the precipitation method shown in the flowchart of FIG. 2, a complex oxide ceramic ($La_2W_2O_9$ (LWO)) of Example 3 was produced. The LWO of Example 3 is a complex oxide ceramic in which Mo of the LMO of Example 2 has been thoroughly substituted by W.

Firstly, an aqueous solution of lanthanum nitrate hexahydrate ($La(NO_3)_3 \cdot 6H_2O$) (5.8 mmol) dissolved in distilled water (5 mL) and an aqueous solution of $(NH_4)_{10}(H_2W_{12}O_{42}) \cdot 4H_2O$ (0.48 mmol) dissolved in distilled water (50 mL) were provided. The two aqueous solutions were mixed at room temperature so that the mole ratio of La to W was adjusted to 1:1 (S21). Then, the solution mixture was maintained in a thermostat bath at 70° C. for 24 hours, to thereby prepare an intermediate (S22).

The intermediate was dried at 120° C. for 12 hours, to thereby yield a dry powder (S23). Portions (about 1.0 g/portion) of the thus-obtained dried powder were each subjected to dry pulverization for 10 minutes by means of an agate mortar and a pestle. The pulverization product was calcined by placing in air at 400° C. for 6 hours (S24), to thereby form a calcined powder of a complex oxide ceramic ($La_2W_2O_9$ (LWO)). The obtained calcined powder was found to have low crystallinity and a specific surface area of 4.5 $m^2$/g.

Portions (about 1.0 g/portion) of the thus-obtained calcined powder were each subjected to dry pulverization for 10 minutes by means of an agate mortar and a pestle. The calcined powder was divided and weighed to portions (about 0.15 g/portion). Ethylene glycol serving as a molding aid was added in an amount of about 2% by volume to each portion with mixing for 10 minutes. The mixture was caused to pass through a polyester sieve, and the powder was press-molded in a metal mold (diameter: 1 cm) by means of a hydraulic press machine at 100 MPa for 3 minutes, to thereby yield a compact (S25). The compact was fired at 1,400° C. for 3 hours in the air (S26), to thereby yield a sintered body of LWO. The obtained sintered body was found to have a single phase of LWO and a relative density of 90%.

Figure 12:
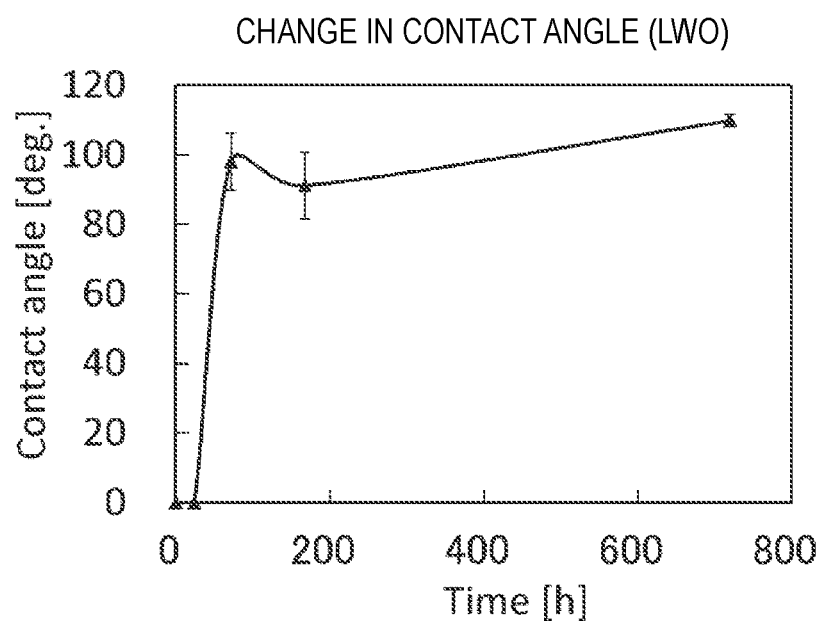
FIG. 12 A graph showing changes in contact angle in Example 3 (LWO: precipitation method).

The change over time in contact angle of the thus-produced LWO of Example 3 was determined through the same measurement method as employed in the aforementioned contact angle measurement method. FIG. 12 shows the results of contact angle measurement. As shown in FIG. 12, the LWO of Example 3 was found to also exhibit high water repellency. In addition, the water repellency of the LWO of Example 3 gradually increased, and the contact angle increased to 110° at a timing 720 hours after the treatment.

Figure 13:
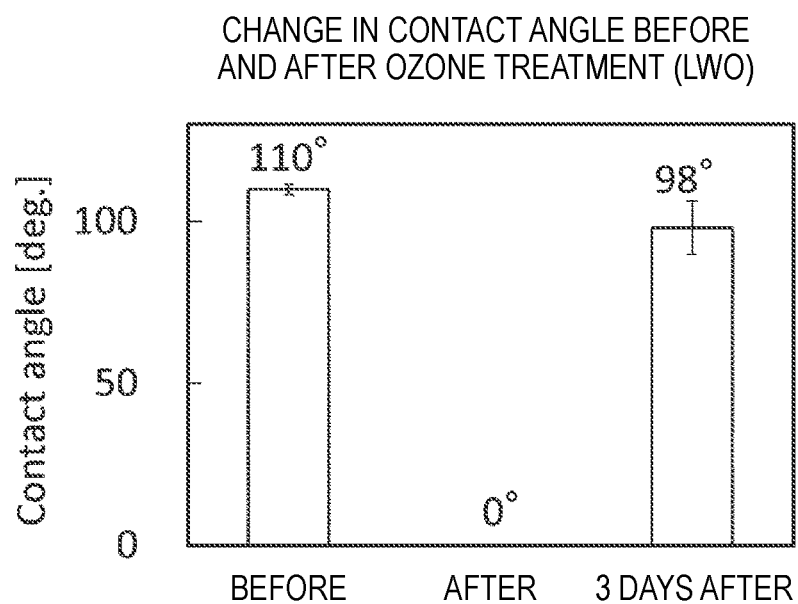
FIG. 13 A graph showing a change in contact angle in Example 3 (LWO: precipitation method) before and after an ozone treatment.

Also, the change in contact angle of the LWO of Example 3 before and after the ozone treatment was determined through the same measurement method as employed in the aforementioned contact angle measurement method. FIG. 13 shows the results of contact angle measurement. As shown in FIG. 13, after hydrophilization through exposure to ozone, the surface became hydrophobic again when the LWO of Example 3 was stored in the dark. These results suggest that the water repellency of the LWO of Example 3 is also enhanced through adsorption of organic matter in the air.

The above tests results have revealed that the LWO of Example 3 also exhibits water repellency, similar to the case of the LMO.

Figure 14:
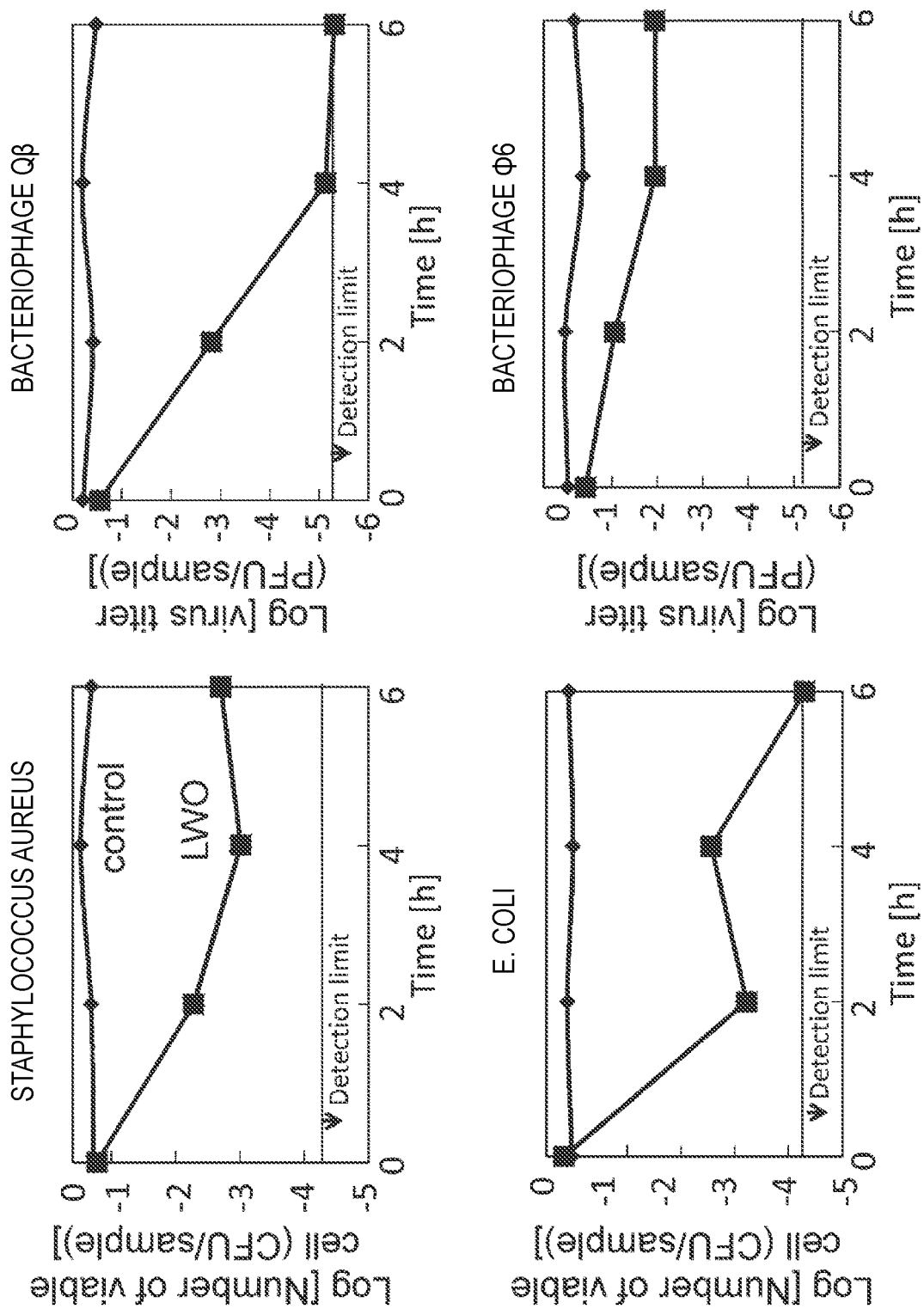
FIG. 14 Graphs each showing results of evaluation of an antibacterial/antiviral property in Example 3 (LWO: precipitation method).

Further, the antibacterial/antiviral property of the LWO of Example 3 was evaluated through the same method as employed in the above-described method. FIG. 14 shows the evaluation results of the antibacterial/antiviral property of the LWO of Example 3. As is clear from FIG. 14, the LWO of Example 3 exhibited a decrease in survival rate by a logarithmic value of 2 or greater within 6 hours, with respect to all tested bacteria and viruses. Thus, the LWO of Example 3 was found to exhibit excellent antibacterial/antiviral activity.

Examples 4 to 6: LMWOs (Precipitation Method)

Through the precipitation method shown in the flowchart of FIG. 2, complex oxide ceramics ($La_2(Mo_{2-x}W_x)O_9$ (LMWO); x=0.5, 1.0, and 1.5) of Examples 4 to 6 were produced. The LMWOs of Examples 4 to 6 are complex oxide ceramics in which Mo of the LMO of Example 2 has been partially substituted by W. Specifically, the compositions of Examples 4 to 6 are $La_2MoWO_9$ (x=1.0), $La_2(Mo_{0.5}W_{1.5})O_9$ (x=1.5), and $La_2(Mo_{1.5}W_{0.5})O_9$ (x=0.5), respectively.

Firstly, an aqueous solution of lanthanum nitrate hexahydrate ($La(NO_3)_3 \cdot 6H_2O$) (5.8 mmol) dissolved in distilled water (5 mL), an aqueous solution of ammonium molybdate tetrahydrate (($NH_4)_6Mo_7O_{24} \cdot 4H_2O$), and an aqueous solution of $(NH_4)_{10}(H_2W_{12}O_{42}) \cdot 4H_2O$ were provided. These aqueous solutions were mixed at room temperature so as to attain the aforementioned compositions (x=0.5, 1.0, and 1.5, respectively) (S21). Then, each of the solution mixtures was maintained in a thermostat bath at 70° C. for 72 hours, to thereby prepare each intermediate (S22).

The intermediate was dried at 120° C. for 24 hours, to thereby yield a dry powder (S23). Portions (about 1.0 g/portion) of the thus-obtained dried powder were each subjected to dry pulverization for 10 minutes by means of an agate mortar and a pestle. The pulverization product was calcined by placing in air at 550° C. for 6 hours (S24), to thereby form a calcined powder of a complex oxide ceramic (LMWO). The obtained calcined powder was found to have a mixed crystal phase of LMO and another crystal phase. The specific surface areas of Example 4 (x=1.0), Example 5 (x=1.5), and Example 6 (x=0.5) were 4.0 $m^2$/g, 5.9 $m^2$/g, and 4.4 $m^2$/g, respectively.

Figure 15:
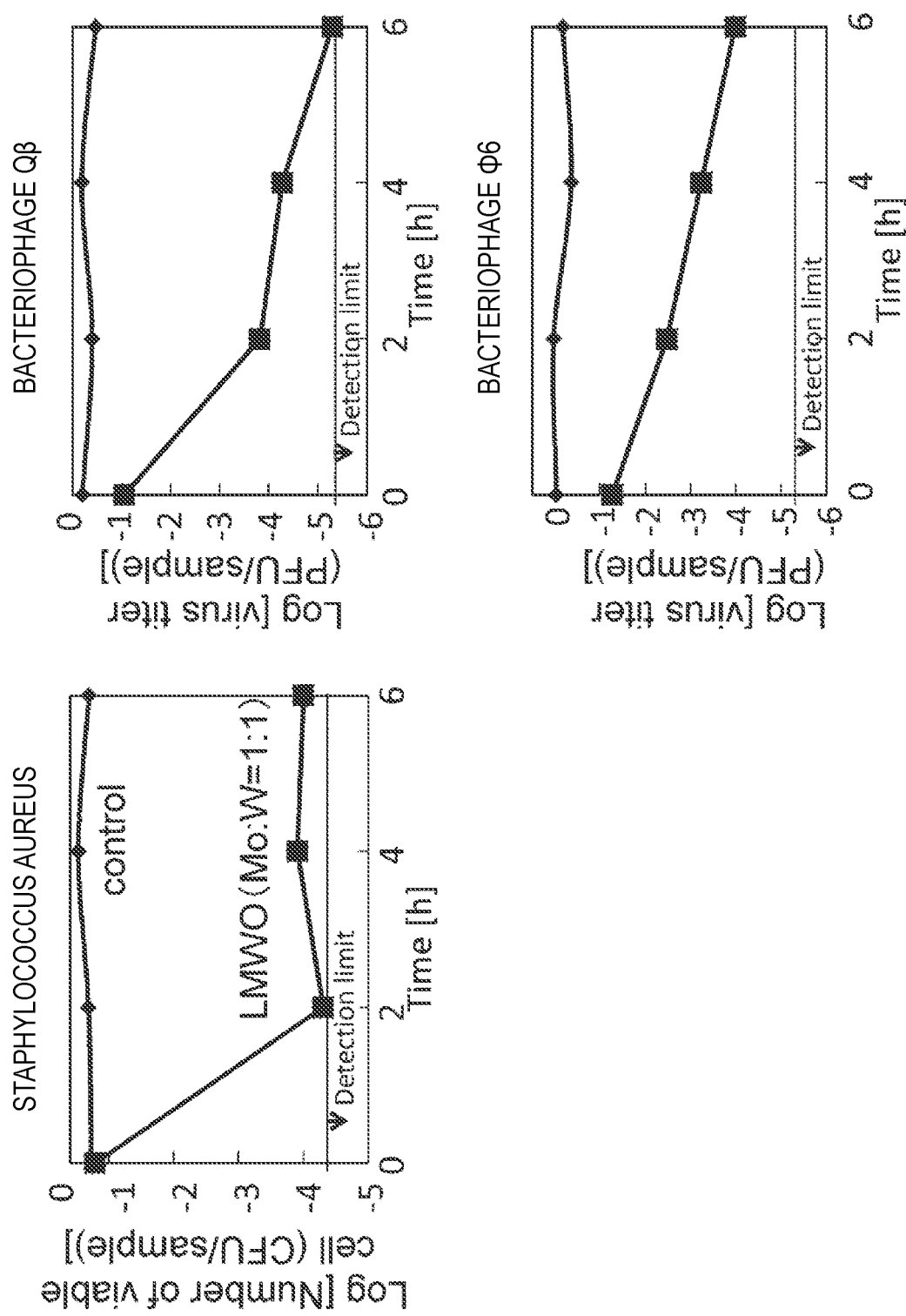
FIG. 15 Graphs each showing results of evaluation of an antibacterial/antiviral property in Example 4 (LMWO: Mo:W=1:1).
Figure 16:
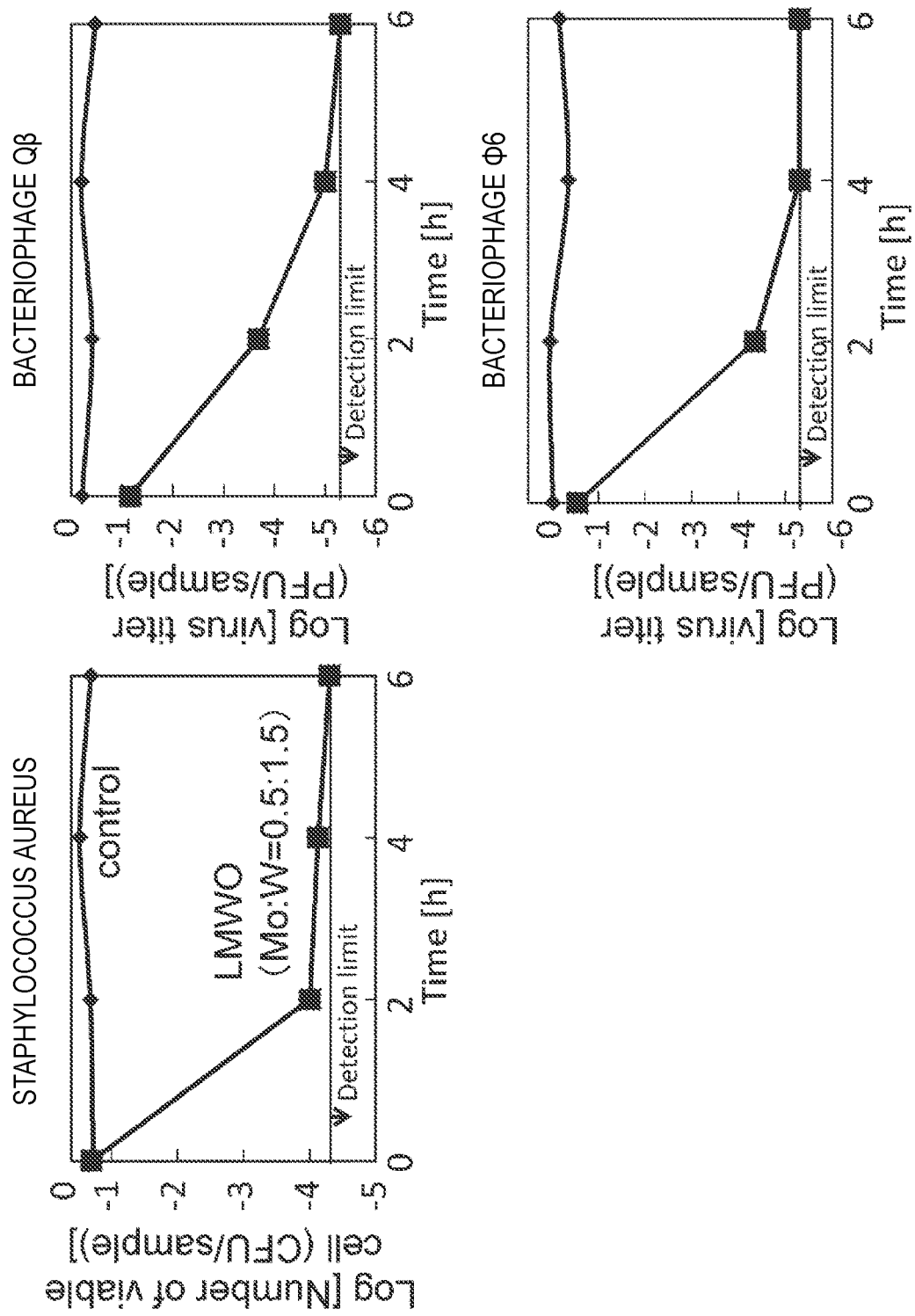
FIG. 16 Graphs each showing results of evaluation of an antibacterial/antiviral property in Example 5 (LMWO: Mo:W=0.5:1.5).
Figure 17:
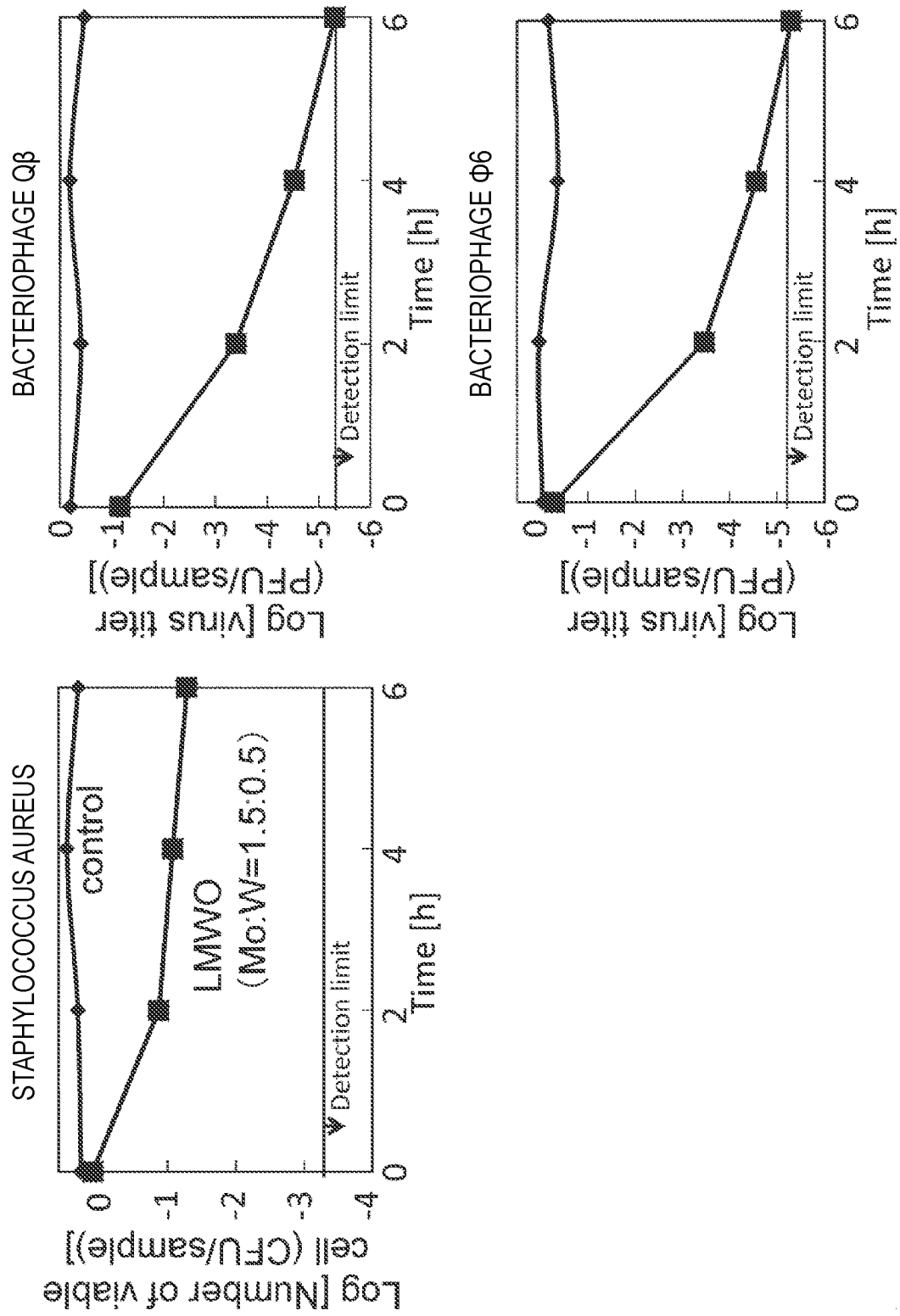
FIG. 17 Graphs each showing results of evaluation of an antibacterial/antiviral property in Example 6 (LMWO: Mo:W=1.5:0.5).

Further, the antibacterial/antiviral property of the calcined powders (Examples 4 to 6) was evaluated through the same method as employed in the above-described method. Notably, the antibacterial property of the calcined powders (Examples 4 to 6) was evaluated with respect to *Staphylococcus aureus*. FIG. 15 shows the evaluation results of the antibacterial/antiviral property of Example 4 (LMWO (Mo:W=1:1)). FIG. 16 shows the evaluation results of the antibacterial/antiviral property of Example 5 (LMWO (Mo:W=0.5:1.5)). FIG. 17 shows the evaluation results of the antibacterial/antiviral property of Example 6 (LMWO (Mo:W=1.5:0.5)).

As is clear from FIGS. 15 to 17, the LMWOs of Examples 4 to 6 exhibited a decrease in survival rate by a logarithmic value of 2 or greater within 6 hours, with respect to all tested bacteria and viruses. Thus, the LMWOs of Examples 4 to 6 were found to exhibit excellent antibacterial/antiviral activity.

Example 7: LCMO (Precipitation Method)

Through the precipitation method shown in the flowchart of FIG. 2, a complex oxide ceramic ($La_{1.8}Ce_{0.2}Mo_2O_9$ (LCMO)) of Example 7 was produced. The LCMO of Example 7 is a complex oxide ceramic in which La of the LMO of Example 2 has been partially substituted by Ce.

Firstly, an aqueous solution of lanthanum nitrate hexahydrate ($La(NO_3)_3 \cdot 6H_2O$) (5.2 mmol) and cerium nitrate hexahydrate ($Ce(NO_3)_3 \cdot 6H_2O$) (0.58 mmol) dissolved in distilled water (5 mL), an aqueous solution of ammonium molybdate tetrahydrate (($NH_4)_6Mo_7O_{24} \cdot 4H_2O$) (0.82 mmol) dissolved in distilled water (50 mL) were provided. These aqueous solutions were mixed at room temperature (S21). Then, the solution mixture was maintained in a thermostat bath at 70° C. for 24 hours, to thereby prepare each intermediate (S22).

The intermediate was dried at 120° C. for 24 hours, to thereby yield a dry powder (S23). Portions (about 1.0 g/portion) of the thus-obtained dried powder were each subjected to dry pulverization for 10 minutes by means of an agate mortar and a pestle. The pulverization product was calcined by placing in air at 500° C. for 6 hours (S24), to thereby form a calcined powder of a complex oxide ceramic ($La_{1.8}Ce_{0.2}Mo_2O_9$ (LCMO)). The obtained calcined powder was found to a specific surface area of 4.4 $m^2$/g.

Portions (about 1.0 g/portion) of the thus-obtained calcined powder were each subjected to dry pulverization for 10 minutes by means of an agate mortar and a pestle. The calcined powder was divided and weighed to portions (about 0.15 g/portion). Ethylene glycol serving as a molding aid was added in an amount of about 2% by volume to each portion with mixing for 10 minutes. The mixture was caused to pass through a polyester sieve, and the powder was press-molded in a metal mold (diameter: 1 cm) by means of a hydraulic press machine at 100 MPa for 3 minutes, to thereby yield a compact (S25). The compact was fired at 900° C. for 3 hours in the air (S26), to thereby yield a sintered body of LCMO. The obtained sintered body was found to have a single phase of LCMO (monoclinic) and a relative density of 94%.

Figure 18:
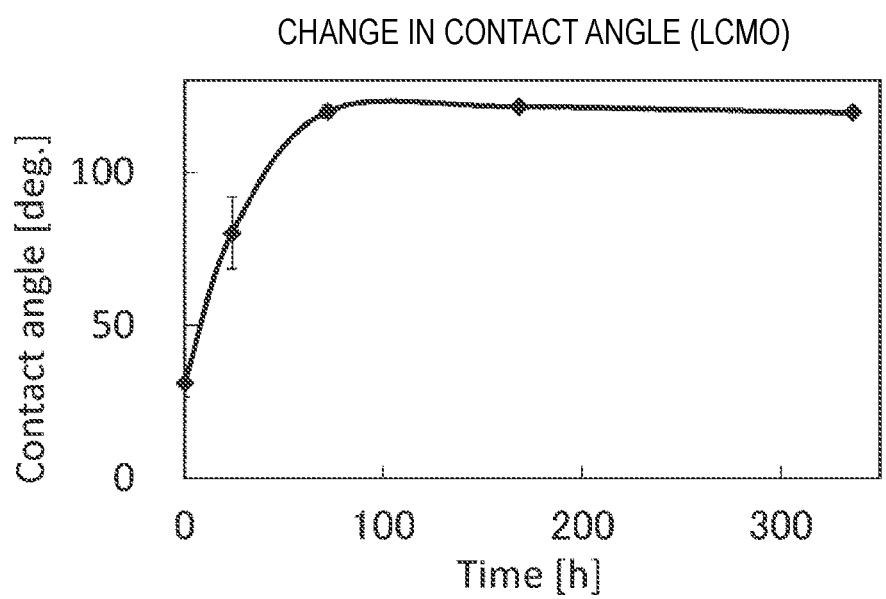
FIG. 18 A graph showing changes in contact angle in Example 7 (LCMO: precipitation method).

The change over time in contact angle of the thus-produced LCMO of Example 7 was determined through the same measurement method as employed in the aforementioned contact angle measurement method. FIG. 18 shows the results of contact angle measurement. As shown in FIG. 18, the LCMO of Example 7 was found to also exhibit high water repellency. In addition, the water contact angle of the LCMO of Example 7 increased to 119° at a timing 72 hours after the treatment.

Figure 19:
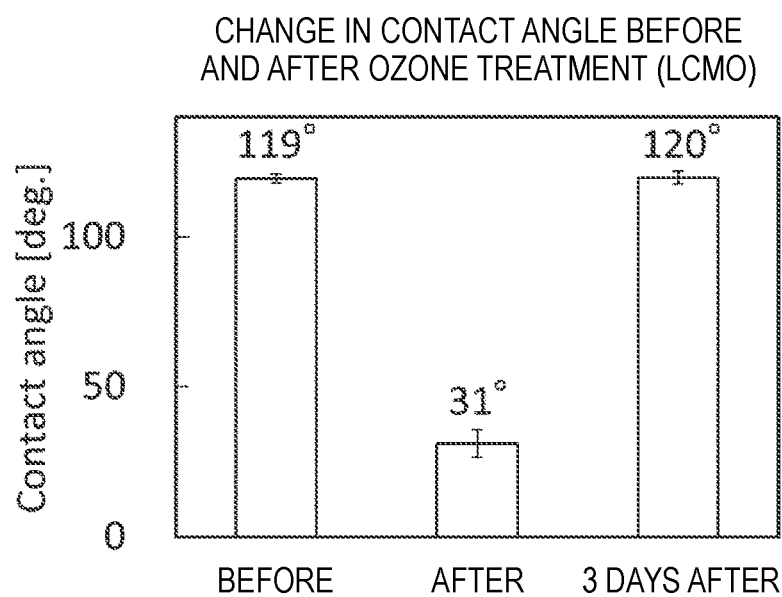
FIG. 19 A graph showing a change in contact angle in Example 7 (LCMO: precipitation method) before and after an ozone treatment.

Also, the change in contact angle of the LCMO of Example 7 before and after the ozone treatment was determined through the same measurement method as employed in the aforementioned contact angle measurement method. FIG. 19 shows the results of contact angle measurement. As shown in FIG. 19, after hydrophilization through exposure to ozone, the surface became hydrophobic again when the LCMO of Example 7 was stored in the dark. These results suggest that the water repellency of the LCMO of Example 7 is also enhanced through adsorption of organic matter in the air.

The above tests results have revealed that the LCMO of Example 7 also exhibits water repellency, similar to the case of the LMO.

Figure 20:
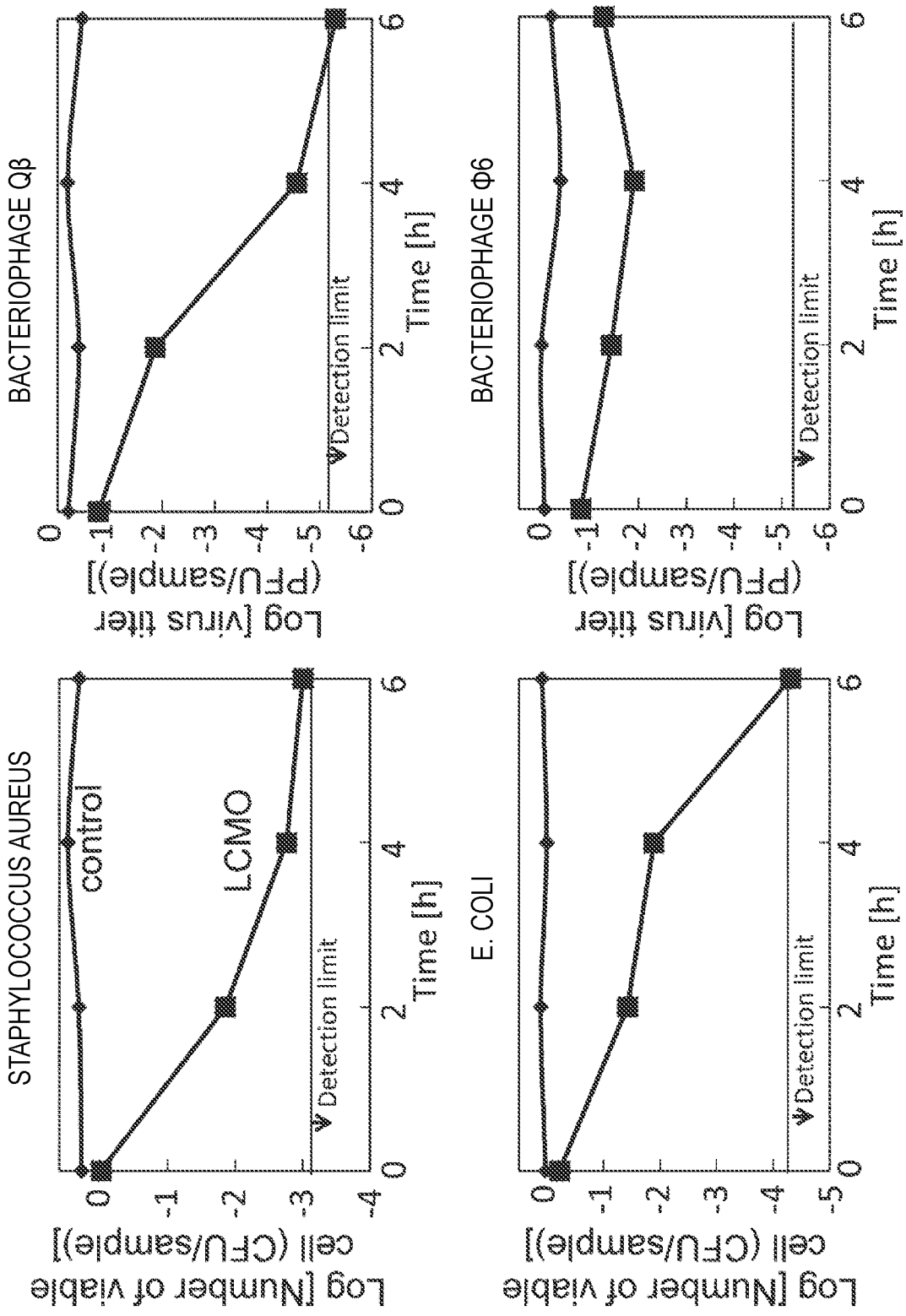
FIG. 20 Graphs each showing results of evaluation of an antibacterial/antiviral property in Example 7 (LCMO: precipitation method).

Further, the antibacterial/antiviral property of the LCMO of Example 7 was evaluated through the same method as employed in the above-described method. FIG. 20 shows the evaluation results of the antibacterial/antiviral property of the LCMO of Example 7. As is clear from FIG. 20, the LCMO of Example 7 exhibited a decrease in survival rate by a logarithmic value of 2 or greater within 6 hours, with respect to all tested bacteria and viruses. Thus, the LCMO of Example 7 was found to exhibit excellent antibacterial/antiviral activity.

As described hereinabove, the complex oxide ceramic of the present embodiment has been proven to serve as a complex oxide ceramic having both self-water repellency and an antibacterial/antiviral property. For example, according to the complex oxide ceramic of the present embodiment, water drop repellency and an antibacterial/antiviral property can be effectively imparted to tableware, glassware, building materials, etc., without using an organic material. As a result, the complex oxide ceramic of the present embodiment can provide a material which realizes energy savings and a reduction in environmental load and which is adaptable to a pandemic viral disease.

What is claimed is:

1. A complex oxide ceramic comprising a rare earth element and at least one element selected from among molybdenum, tungsten, and vanadium, wherein a surface of the complex oxide ceramic has a water contact angle of 88° to 119°, and wherein, at the surface of the complex oxide ceramic, a ratio of carbon to the sum of the rare earth element and the at least one element selected from among molybdenum, tungsten, and vanadium is 1.7 atm % to 2.1 atm %.

2. The complex oxide ceramic according to claim 1, wherein the rare earth element is at least one species selected from among La, Ce, and Gd.

3. The complex oxide ceramic according to claim 1, which is represented by $(La_{2-x}Ce_x)(Mo_{2-y}W_y)O_9$ (x=0 to 2, y=0 to 2).

4. The complex oxide ceramic according to claim 1, which is represented by $La_2(Mo_{2-y}W_y)O_9$ (y=0 to 2).

5. The complex oxide ceramic according to claim 1, which is represented by $La_2Mo_2O_9$.

6. The complex oxide ceramic according to claim 1, which is represented by $La_2W_2O_9$.

7. The complex oxide ceramic according to claim 1, wherein the percent bacterial or viral reduction as measured after passage of 6 hours through the film cover method is 99% or greater.

8. An article provided with a complex oxide ceramic as recited in claim 1 on at least a part of the surface thereof.

9. A method for producing a complex oxide ceramic which method comprises:
adding a hydroxycarboxylic acid and a glycol to an aqueous solution containing a rare earth element-containing compound and at least one element selected from among molybdenum, tungsten, and vanadium, and then heating to cause esterification reaction between the hydroxycarboxylic acid and the glycol, to thereby induce gelation;
drying a gel formed by the adding and heating;
calcining a powder obtained by drying the gel;
molding the calcined powder; and
firing a compact formed through the molding, wherein, in the firing, the compact is fired in an atmosphere having a water content of 1,000 ppm or lower and an organic substance concentration of 1,000 ppm or lower, and containing oxygen in an amount of 0.1% or greater.

10. The complex oxide ceramic production method according to claim 9, wherein a rare earth nitrate salt is used as the rare earth element-containing compound, and
ammonium molybdate is used as a molybdenum-containing compound.

11. The complex oxide ceramic production method according to claim 9, wherein lanthanum nitrate hexahydrate is used as the rare earth element-containing compound, and
ammonium molybdate tetrahydrate is used as a molybdenum-containing compound.

12. The complex oxide ceramic production method according to claim 9, wherein the hydroxycarboxylic acid is citric acid, and
the glycol is ethylene glycol.

* * * * *